United States Patent [19]
Ulwick

[11] Patent Number: 6,085,165
[45] Date of Patent: Jul. 4, 2000

[54] PROCESS AND SYSTEM FOR OUTCOME BASED MASS CUSTOMIZATION

[76] Inventor: Anthony W. Ulwick, 106 N. Lake Dr., Lantana, Fla. 33462

[21] Appl. No.: 08/763,668

[22] Filed: Dec. 11, 1996

Related U.S. Application Data

[63] Continuation-in-part of application No. 08/716,948, Sep. 20, 1996.
[60] Provisional application No. 60/025,186, Sep. 12, 1996.

[51] Int. Cl.$^7$ ........................................ G06F 17/60
[52] U.S. Cl. ............................... 705/7; 705/10
[58] Field of Search ................. 705/2, 3, 7–10; 707/5, 6; 348/1; 455/2

[56] References Cited

U.S. PATENT DOCUMENTS

| | | | |
|---|---|---|---|
| 4,996,642 | 2/1991 | Hey ........................................... | 705/27 |
| 5,041,972 | 8/1991 | Frost ......................................... | 705/10 |
| 5,124,911 | 6/1992 | Sack ......................................... | 705/10 |
| 5,182,793 | 1/1993 | Alexander et al. ....................... | 706/13 |
| 5,634,021 | 5/1997 | Rosenberg et al. ..................... | 345/353 |
| 5,734,890 | 3/1998 | Case et al. ............................... | 707/5 |

OTHER PUBLICATIONS

GartnerGroup Executive Services, "Executive Market Analysis Program, Today's Market Program demands Better Analysis," pp. 11–36 (first provided to clients in Nov. 1993).
Thomas L. Saaty, "Decision Making for Leaders", pp. 1–33, 1988.
Julian W. Vincze, "Expert Choice", pp. 10–12, Mar. 1990.

*Primary Examiner*—Eric W. Stamber
*Assistant Examiner*—Hani M. Kazimi
*Attorney, Agent, or Firm*—Malin, Haley, DiMaggio & Crosby

[57] ABSTRACT

A system and process for configuration and optimization of an electronic device is provided wherein a user is presented with, and prioritizes, device specific desired outcomes, whereafter a computer subroutine prioritizes the desired outcomes and corresponding predictive metrics and device features resulting in a set of implementation commands which are then transmitted to the device which automatically configures customizable features accordingly such that the device is customized based on the user's prioritized desired outcomes.

12 Claims, 22 Drawing Sheets

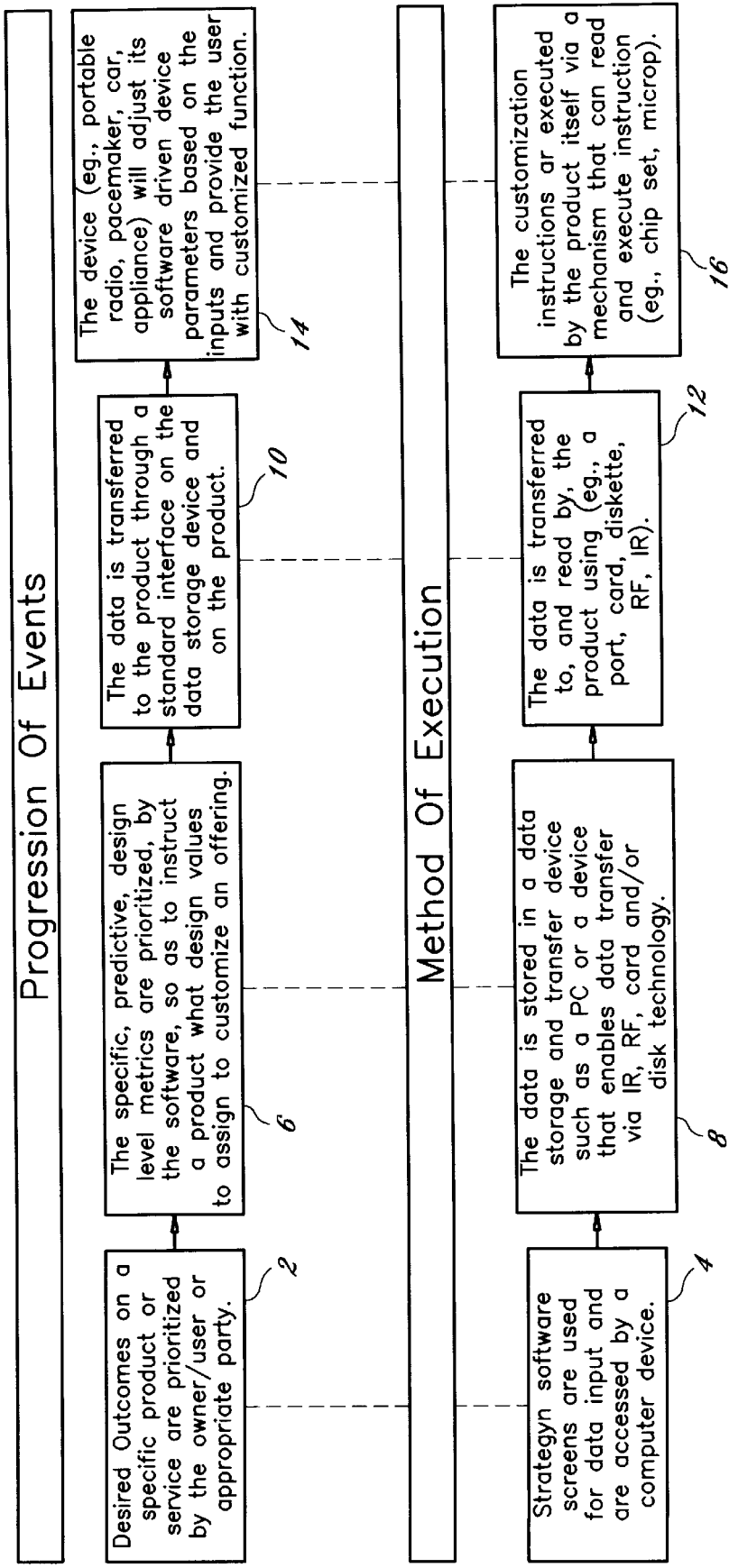

Basic System Level Logic For Outcome-Based Mass Customiztion Technology

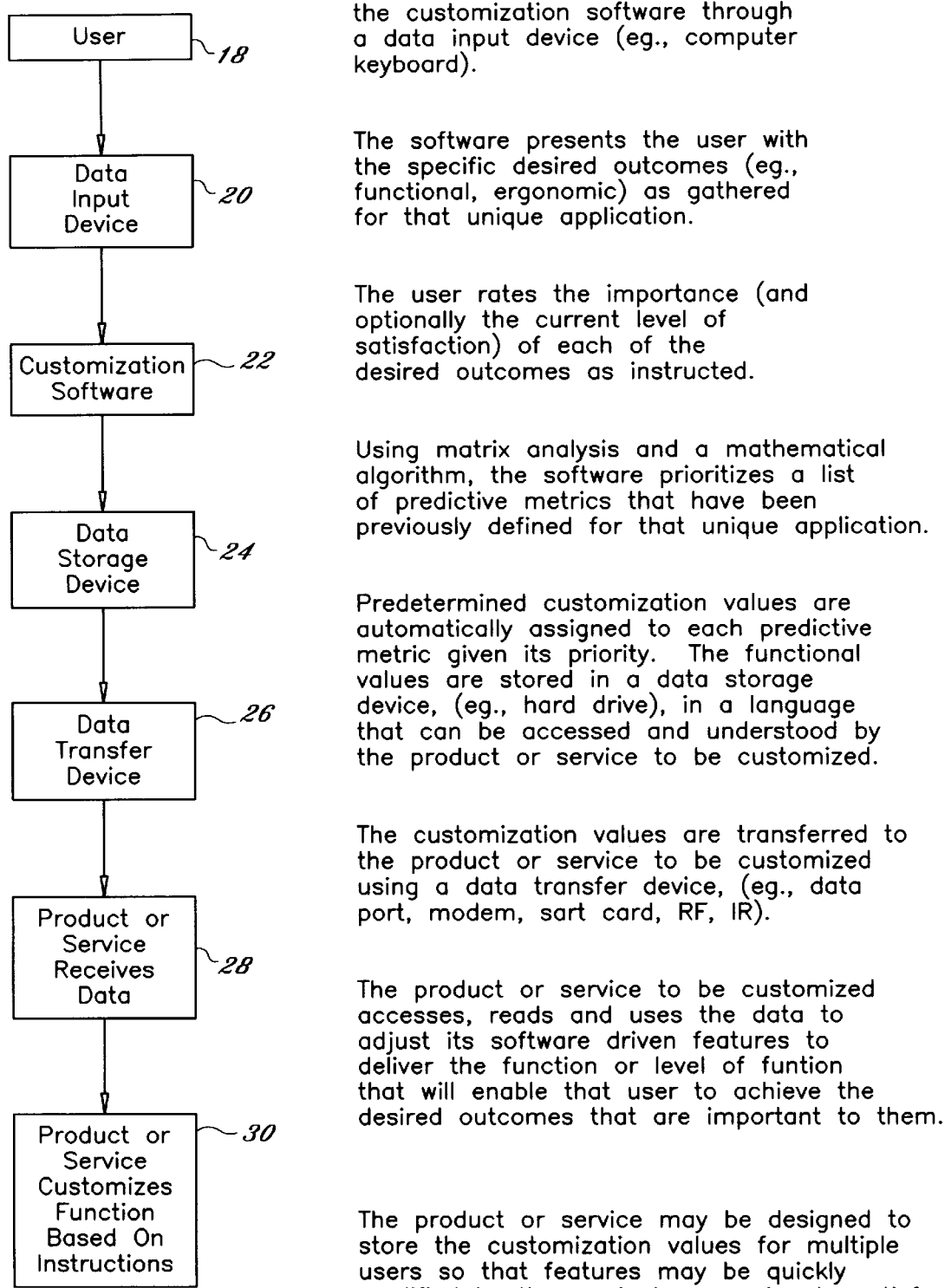

FIG. 2

User ~18 — The user is provided with access to the customization software through a data input device (eg., computer keyboard).

Data Input Device ~20 — The software presents the user with the specific desired outcomes (eg., functional, ergonomic) as gathered for that unique application.

Customization Software ~22 — The user rates the importance (and optionally the current level of satisfaction) of each of the desired outcomes as instructed.

Data Storage Device ~24 — Using matrix analysis and a mathematical algorithm, the software prioritizes a list of predictive metrics that have been previously defined for that unique application.

Data Transfer Device ~26 — Predetermined customization values are automatically assigned to each predictive metric given its priority. The functional values are stored in a data storage device, (eg., hard drive), in a language that can be accessed and understood by the product or service to be customized.

Product or Service Receives Data ~28 — The customization values are transferred to the product or service to be customized using a data transfer device, (eg., data port, modem, sart card, RF, IR).

Product or Service Customizes Function Based On Instructions ~30 — The product or service to be customized accesses, reads and uses the data to adjust its software driven features to deliver the function or level of funtion that will enable that user to achieve the desired outcomes that are important to them.

The product or service may be designed to store the customization values for multiple users so that features may be quickly modified by the product or service to satisfy the unique desired outcomes of another user.

Mass Customization Technology
Example 1

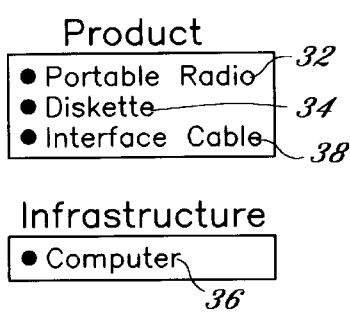

- The "user" loads the diskette into a computer and accesses the customization software.

- The user is presented with and prioritizes the desired outcomes on the product.

- Upon completion the data is downloaded to the device via the interface cable.

- The radio uses to the data to optimize the software driven function to meet the users unique desired outcomes.

FIG. 3

Mass Customization Technology
Example 2

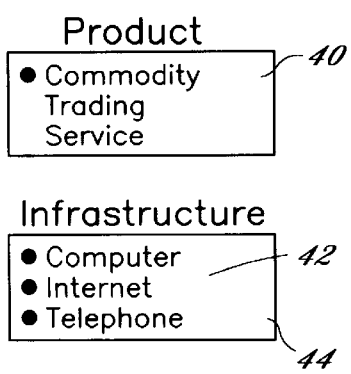

- The trader accesses the customiztion software from the Web page of the commodity trading company.
- The user is presented with and prioritizes the desired outcomes on a commodity trading service.
- Upon completion the data is sent to the company location and is stored on the companies computerized trading services system.
- When the trader calls the service and enters a special code the computerized trading system is optimized to satisfy the unique desired outcomes of the trader.

| | |
|---|---|
| 1 | <- Number of therapies modulated by hemodynamic status |
| 2 | <-> Percent of SVT episodes correctly discriminated from VT episodes |
| 3 | <-> Percent of arrhythmias that can be prevented |
| 4 | <-> Number of hemodynamic parameters surrounding an episode that are known |
| 5 | -> Time/steps to obtain the patient's history of previous follow-ups |
| 6 | <-> Number of drug sensitive parameters the device can recognize and adapt to |
| 7 | -> Time/steps to obtain an acceptable defibrillation threshold |
| 8 | <-> Ratio of useable stored energy to power consumption |
| 9 | <-> Percent of therapies delivered when the heart is depolarized or unexcited |
| 10 | -> Time/steps required to determine a patient's defibrillation threshold |
| 11 | -> Number of incorrect diagnoses that can be derived |
| 12 | -> Number of times painful stimuli are required to revert the patient |
| 13 | -> Number of times uncomfortable stimuli are required to test device |
| 14 | -> Time required for the user to determine/take the next programming step |
| 15 | -> Time/steps to determine a patient's pacing threshold |
| 16 | -> Percent of therapies that inadvertently cause AF |
| 17 | <-> Time the patient is symptomatic |
| 18 | -> Time required to acquire data from the device |
| 19 | <-> Number of parameters measured that predict the occurrence of a future event |
| 20 | <-> Stroke volume when the patient is at rest |
| 21 | <-> Percent of required unscheduled follow-ups annunciated to the patient |
| 22 | -> Time required to assess the patient's status from a remote location |
| 23 | <-> Percent of atrial fibrillation episodes that can be terminated |
| 24 | -> Time/steps required to troubleshoot the system |
| 25 | <-> Percent of follow-up data that can be accessed from the patient's home |
| 26 | <-> Percent of therapies that can be delivered while the device is being accessed |
| 27 | <-> Cardiac output that can be delivered in response to metabolic demand |
| 28 | <-> Number of therapeutic events that are annunciated to the patient |
| 29 | <-> Number of parameters that can be programmed at a remote location |

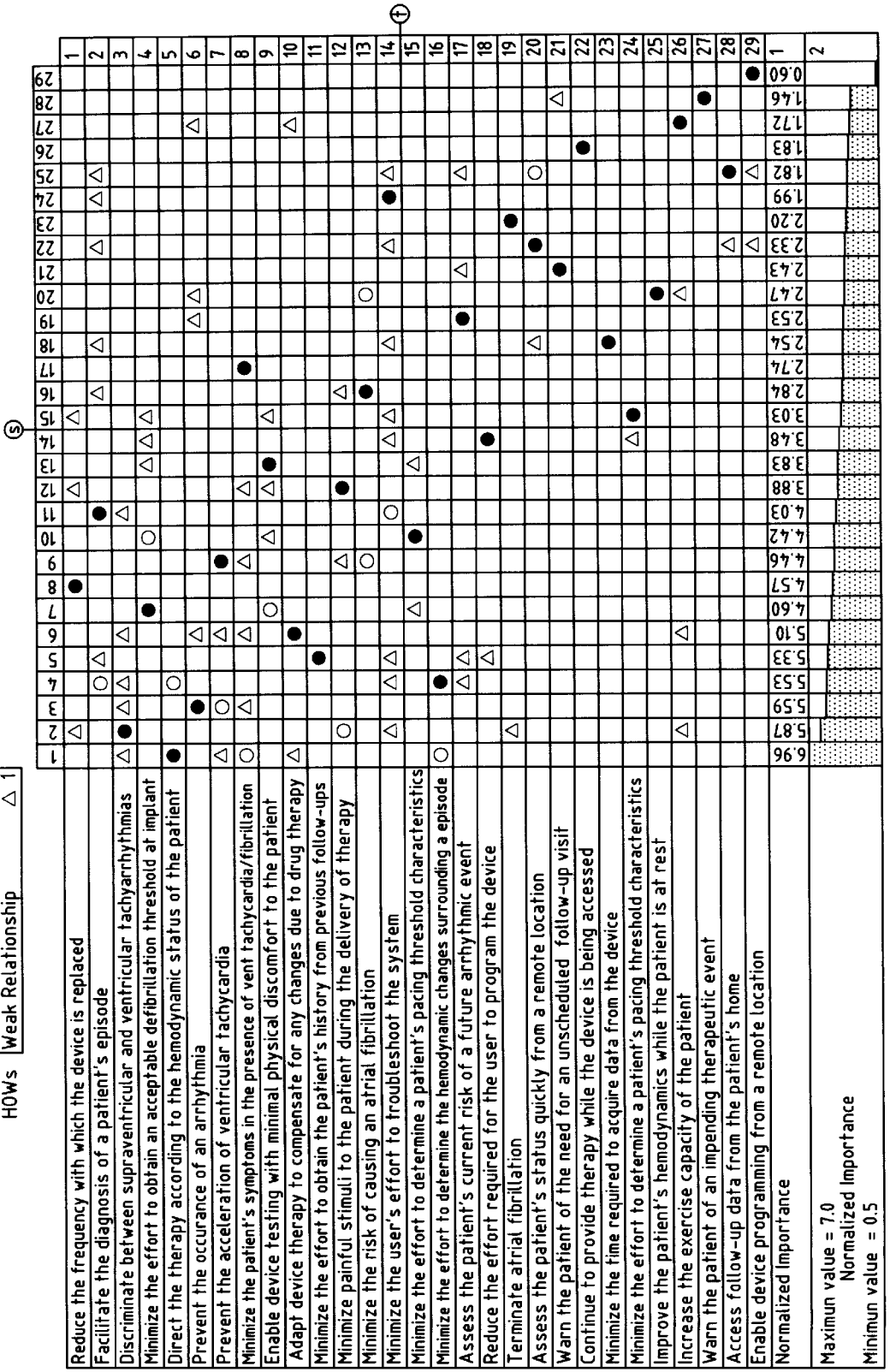

FIG. 9b

| | Importance for Case 1 | Percent Importance<br>Maximum value = 7.0<br>Minimum value = 0.0 |
|---|---|---|
| 1 | –> Number of therapies modulated by hemodynamic status | |
| 2 | –> Percent of SVT episodes correctly discriminated from VT episodes | |
| 3 | –> Percent of arrhythmias that can be prevented | |
| 4 | –> Number of hemodynamic parameters surrounding an episode that are known | |
| 5 | –> Time/steps to obtain the patient's history of previous follow-ups | |
| 6 | –> Number of drug sensitive parameters the device can recognize and adapt to | |
| 7 | –> Time/steps required to obtain an acceptable defibrillation threshold | |
| 8 | –> Ratio of useable stored energy to power consumption | |
| 9 | –> Percent of therapies delivered when the heart is depolarized or unexcited | |
| 10 | –> Time/steps to determine a patient's defibrillation threshold | |
| 11 | –> Number of incorrect diagnoses that can be derived | |
| 12 | –> Number of times painful stimuli are required to revert the patient | |
| 13 | –> Number of times uncomfortable stimuli are required to test the device | |
| 14 | –> Time required for the user to determine/take the next programming step | |
| 15 | –> Time/steps to determine a patient's pacing threshold | |
| 16 | –> Percent of therapies that inadvertently cause AF | |
| 17 | –> Time the patient is symptomatic | |
| 18 | –> Time required to acquire data from the device | |
| 19 | –> Number of parameters measured that predict the occurrence of a future event | |
| 20 | –> Stroke volume when the patient is at rest | |
| 21 | –> Percent of required unscheduled follow-ups annunciated to the patient | |
| 22 | –> Time required to assess the patient's status from a remote location | |
| 23 | –> Percent of atrial fibrillation episodes that can be terminated | |
| 24 | –> Time/steps required to troubleshoot the system | |
| 25 | –> Percent of follow-up data that can be accessed from the patient's home | |
| 26 | –> Percent of therapies that can be delivered while the device is being accessed | |
| 27 | –> Cardiac output that can be delivered in response to metabolic demand | |
| 28 | –> Number of therapeutic events that are annunciated to the patient | |
| 29 | –> Number of parameters that can be programmed at a remote location | |

| # | Value |
|---|---|
| 1 | 10.0 |
| 2 | 10.0 |
| 3 | 10.0 |
| 4 | 9.0 |
| 5 | 9.0 |
| 6 | 9.0 |
| 7 | 8.0 |
| 8 | 8.0 |
| 9 | 8.0 |
| 10 | 7.0 |
| 11 | 7.0 |
| 12 | 7.0 |
| 13 | 6.0 |
| 14 | 6.0 |
| 15 | 6.0 |
| 16 | 5.0 |
| 17 | 5.0 |
| 18 | 5.0 |
| 19 | 4.0 |
| 20 | 4.0 |
| 21 | 4.0 |
| 22 | 3.0 |
| 23 | 3.0 |
| 24 | 3.0 |
| 25 | 2.0 |
| 26 | 2.0 |
| 27 | 2.0 |
| 28 | 1.0 |
| 29 | 1.0 |

Defribillator Predictive Metrics, Case 1

The Numerical Value For Each Predictive Metric Is Its Customization Value Prioritized Based On The Importance Ratings Assigned To The Desired Outcomes For Case 1.

| Customization Value | 1 |
|---|---|
| Maximum value = 7.0 Customization Value | 2 |
| Minimum value = 0.5 | |

| | | | |
|---|---|---|---|
| 6.96 | 1 | --> | Number of therapies modulated by hemodynamic status |
| 5.87 | 2 | --> | Percent of SVT episodes correctly discriminated from VT episodes |
| 5.58 | 3 | --> | Percent of arrhythmias that can be prevented |
| 5.53 | 4 | -X | Number of hemodynamic parameters surrounding an episode that are known |
| 5.33 | 5 | <-- | Time/steps to obtain the patients history of previous follow-ups |
| 5.10 | 6 | --> | Number of drug sensitive parameters the device can recognize and adapt to |
| 4.60 | 7 | <-- | Time/steps to obtain an acceptable defibrillation threshold |
| 4.57 | 8 | --> | Ratio of useable stored energy to power consumption |
| 4.48 | 9 | --> | Percent of therapies delivered when the hear is depolarized or unexcited |
| 4.42 | 10 | <-- | Time/steps required to determine a patients defibrillation threshold |
| 4.03 | 11 | <-- | Number of incorrect diagnoses that can be derived |
| 3.88 | 12 | <-- | Number of times painful stimuli are required to revert the patient |
| 3.63 | 13 | <-- | Number of times uncomfortable stimuli are required to test the device |
| 3.48 | 14 | <-- | Time required for the user to determine/take the next programming step |
| 3.03 | 15 | <-- | Time/steps to determine a patients pacing threshold |
| 2.84 | 16 | <-- | Percent of therapies that inadvertently cause AF |
| 2.74 | 17 | <-- | Time the patient is symptomatic |
| 2.54 | 18 | <-- | Time required to acquire data from the device |
| 2.53 | 19 | --> | Number of parameters measured that predict the occurence of a future event |
| 2.47 | 20 | -X | Stroke volume when the patient is at rest |
| 2.43 | 21 | --> | Percent of required unscheduled follow-ups annunciated to the patient |
| 2.33 | 22 | <-- | Time required to assess the patients status from a remote location |
| 2.20 | 23 | --> | Percent of atrial fibrillation episodes that can be terminated |
| 1.99 | 24 | <-- | Time/steps required to troubleshoot the system |
| 1.92 | 25 | --> | Percent of follow-up data that can be accessed from the patients home |
| 1.83 | 26 | --> | Percent of therapies that can be delivered while the device is being accessed |
| 1.72 | 27 | -X | Cardiac output that can be delivered in response to metabolic demand |
| 1.46 | 28 | -X | Number of theraputic events that are annunciated to the patients |
| 0.50 | 29 | --> | Number of parameters that can be programmed at a remote location |

FIG. 10

| | |
|---|---|
| 1 | Activate transtelephonic monitoring system |
| 2 | Activate transtelephonic remote programing feature |
| 3 | Enable remote access to device data using RF data transfer |
| 4 | Activate monitoring to improve stroke volume when the patient is at rest |
| 5 | Activate annunciation feature to inform patient of impending theraputic events |
| 6 | Activate monitoring of left and right ventricles to detect metabolic conditions |
| 7 | Activate annunciation mechanism to inform patient of a required doctor visit |
| 8 | Enable access to data in the atrium to determine if the heart is depolarized |
| 9 | Enable high speed telemetry capability |
| 10 | Activate programming guidance format |
| 11 | Enable automated pacing threshold detection |
| 12 | Activate shock therapy mechanism for Atrial Fibrillation |
| 13 | Activate storage and recall of follow-up data that is stored in the device |
| 14 | Enable therapy delivery algorithm to ensure therapy presides over testing |
| 15 | Activate ongoing monitoring/storing of hemodynamic parameters |
| 16 | Enable multiple ventricle therapy delivery capability |
| 17 | Enable algorithm to monitor drug presence and adapt function to accomodate |
| 18 | Enable testing algorithm based on shock success and shock impedence |
| 19 | Enable monitoring of QT interval and T wave amplitude to prevent arrhythmias |
| 20 | Enable the automatic detection of the patient's defibrillation threshold |
| 21 | Enable ongoing comparison of patient data to historical database to find trend |
| 22 | Activate ventricular rate stabilization algorithm during Atrial Fibrillation |
| 23 | Enable comparison of respiration rate and tidal volume for a SVT or VT episode |
| 24 | Enable synchronization of shocks to ventricle when AV delay less than 100ms |
| 25 | Activate the improved noise algorithm to better access required therapy |
| 26 | Enable measurement of mixed capacitor biphasic waveforms to set threshold |
| 27 | Activate self diagnostic, error detection and recording algorithm |
| 28 | Activate patient diagnosis algorithm to measure and compare the diagnostic data |
| 29 | Activate the reduce monitoring current algorithm to increase device longevity |

Feature Set Customization, Case 1

WHATs Strong Relationship ● 9
VS. Medium Relationship ○ 3
HOWs Weak Relationship △ 1

Maximum value = 6.5 Customized Feature Set
Minimum value = 1.2

FIG. 12b

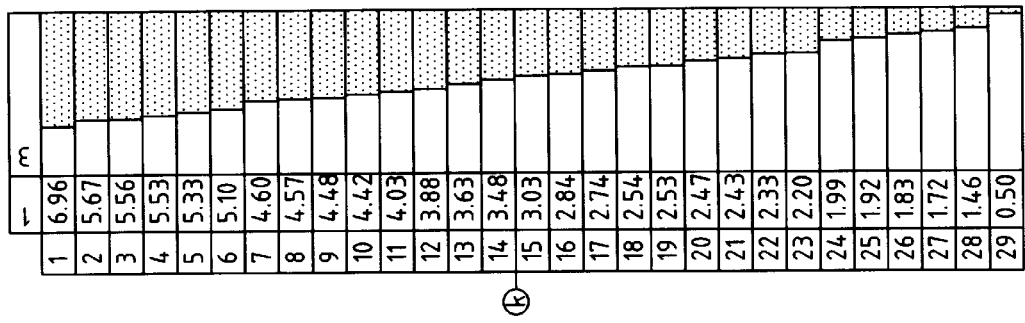

| | | |
|---|---|---|
| 1 | Customization Value, Case 1 | |
| 3 | Maximum value = 10.0<br>Customization Value, Case 1<br>Minimum value = 0.0 | |

| | | |
|---|---|---|
| 1 | Enable access to data in the atrium to determine if the heart is depolarized | |
| 2 | Activate storage and recall of follow-up data that is stored in the device | |
| 3 | Enable multiple ventricle therapy delivery capability | |
| 4 | Enable testing algorithm based on shock success and shock impedence | |
| 5 | Activate ongoing monitoring/storing of hemodynamic parameters | |
| 6 | Enable algorithm to monitor drug presence and adapt function to accomodate | |
| 7 | Enable comparison of respiration rate and tidal volume for a SVT or VT episode | |
| 8 | Enable monitoring of QT interval and T wave amplitude to prevent arrhythmias | |
| 9 | Activate monitoring to improve stroke volume when the patient is at rest | |
| 10 | Activate programming guidance format | |
| 11 | Enable the automatic detection of the patient's defibrillation threshold | |
| 12 | Activate monitoring of left and right ventricles to detect metabolic conditions | |
| 13 | Activate ventricular rate stabilization algorithm during Atrial Fibrillation | |
| 14 | Enable measurement of mixed capacitor biphasic waveforms to set threshold | |
| 15 | Activate patient diagnosis algorithm to measure and compare diagnostic data | |
| 16 | Enable remote access to device data using RF data transfer | |
| 17 | Enable automated pacing threshold detection | |
| 18 | Activate the improved noise algorithm to better access required therapy | |
| 19 | Activate ongoing comparison of patient to historical database to find trend | |
| 20 | Activate shock therapy mechanism for Atrial Fibrillation | |
| 21 | Enable high speed telemetry capability | |
| 22 | Activate annunciation mechanism to inform patient of a required doctor visit | |
| 23 | Activate the reduce monitoring current algorithm to increase device longevity | |
| 24 | Enable synchronization of shocks to ventricle when AV delay less than 100ms | |
| 25 | Activate transtelephonic monitoring system | |
| 26 | Enable therapy delivery algorithm to ensure therapy presides over testing | |
| 27 | Activate self diagnostic, error detection and recording algorithm | |
| 28 | Activate annunciation feature to inform patient of impending therapeutic events | |
| 29 | Activate transtelephonic remote programming feature | |

FIG. 13

Implementation Of Feature Set, Case 1
An Example Of A Potential Implementation Of The Customized Feature Set

| | 1 | 2 | 3 | | |
|---|---|---|---|---|---|
| 1 | 6.48 | | Enabled | 1 | Enable access to data in the atrium to determine if the heart is depolarized |
| 2 | 5.93 | | Activated | 2 | Activate storage and recall of follow-up data that is stored in the device |
| 3 | 5.83 | | Enabled | 3 | Enable multiple ventricle therapy delivery capability |
| 4 | 5.53 | | Enabled | 4 | Enable testing algorithm based on shock success and shock impedence |
| 5 | 5.37 | | Activated | 5 | Activate ongoing monitoring/storing of hemodynamic parameters |
| 6 | 4.69 | | Enabled | 6 | Enable algorithm to monitor drug presence and adapt function to accomodate |
| 7 | 4.63 | | Enabled | 7 | Enable comparison of respiration rate and tidal volume for a SVT or VT episode |
| 8 | 4.37 | | Enabled | 8 | Enable monitoring of QT interval and T wave amplitude to prevent arrhythmias |
| 9 | 4.14 | | Activated | 9 | Activate monitoring to improve stroke volume when the patient is at rest |
| 10 | 3.79 | | Activated | 10 | Activate programming guidance format |
| 11 | 3.72 | | Enabled | 11 | Enable the automatic detection of the patients defribillation threshold |
| 12 | 3.72 | | Activated | 12 | Activate monitoring of left and right ventricles to detect metabolic conditions |
| 13 | 3.54 | | Activated | 13 | Activate ventricular rate stabilization algorithm during Atrial Fibrillation |
| 14 | 3.43 | | Enabled | 14 | Enable measurement of mixed capacitor biphasic waveforms to set threshold |
| 15 | 3.04 | | Activated | 15 | Activate patient diagnosis algorithm to measure and compare the diagnostic data |
| 16 | 3.01 | | Enabled | 16 | Enable remote access to device data using RF data transfer |
| 17 | 2.95 | | Disabled | 17 | Enable automated pacing threshold detection |
| 18 | 2.82 | | Disabled | 18 | Activate the improved noise algorithm to better access required therapy |
| 19 | 2.79 | | Disabled | 19 | Activate ongoing comparison of patient data to historical database to find trend |
| 20 | 2.71 | | Disabled | 20 | Activate shock therapy mechanism for Atrial Fibrillation |
| 21 | 2.67 | | Disabled | 21 | Enable high speed telemetry capability |
| 22 | 2.58 | | Disabled | 22 | Activate annunciation mechanism to inform patient of a required doctor visit |
| 23 | 2.29 | | Disabled | 23 | Activate the reduce monitoring current algorithm to increase device longevity |
| 24 | 2.13 | | Disabled | 24 | Enable synchronization of shocks to ventricle when AV delay less than 100ms |
| 25 | 2.00 | | Disabled | 25 | Activate transtelephonic monitoring system |
| 26 | 1.75 | | Disabled | 26 | Enable therapy delivery algorithm to ensure therapy presides over testing |
| 27 | 1.55 | | Disabled | 27 | Activate self diagnostic, error detection and recording algorithm |
| 28 | 1.31 | | Disabled | 28 | Activate annunciation feature to inform patient of impending theraputic events |
| 29 | 1.21 | | Disabled | 29 | Activate transtelephonic remote programming feature |

| 1 | Customized Feature Set |
|---|---|
| 2 | Maximum value = 6.5 Customized Feature Set  Minimum value = 1.2 |
| 3 | Implementation |

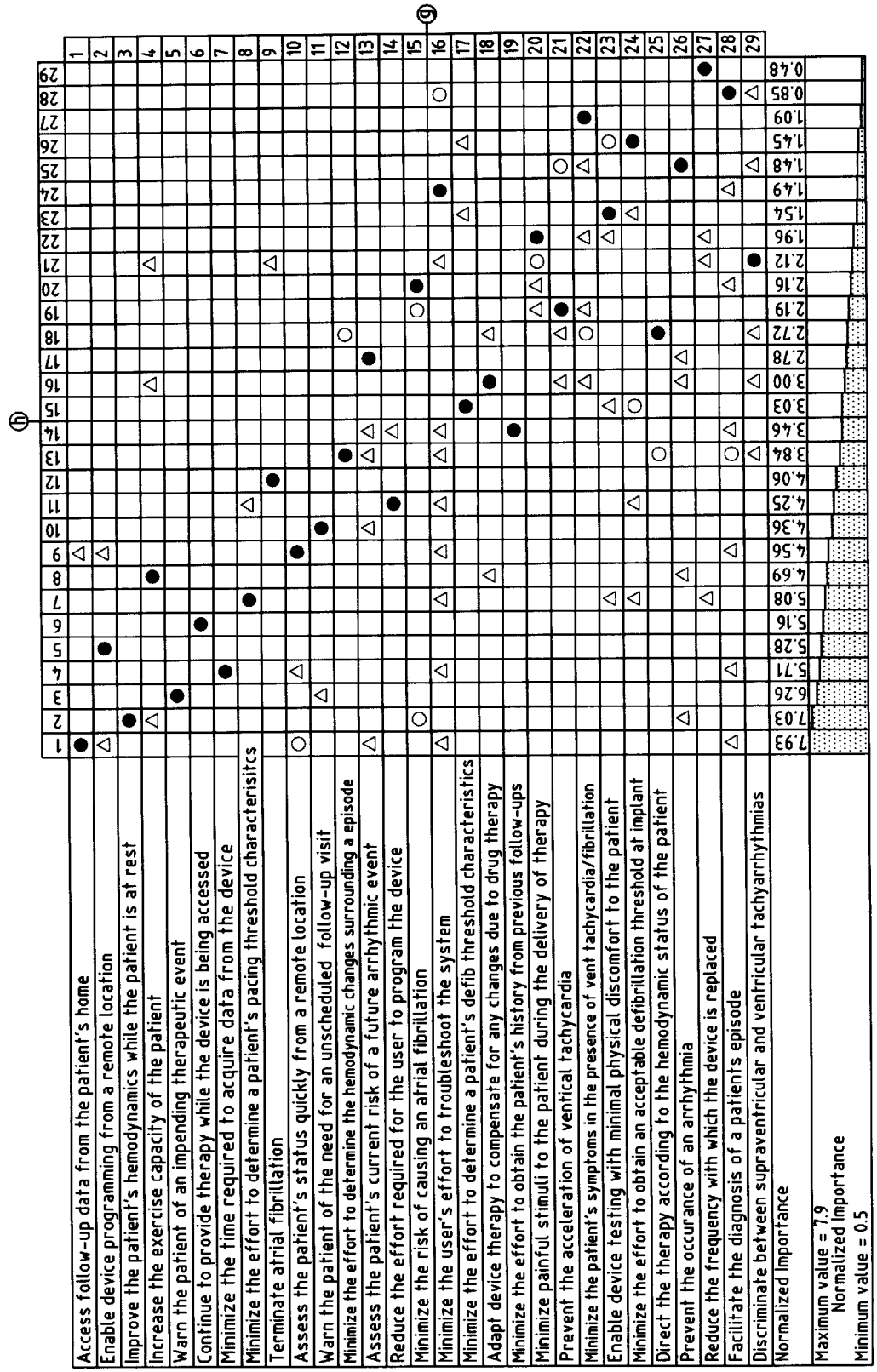

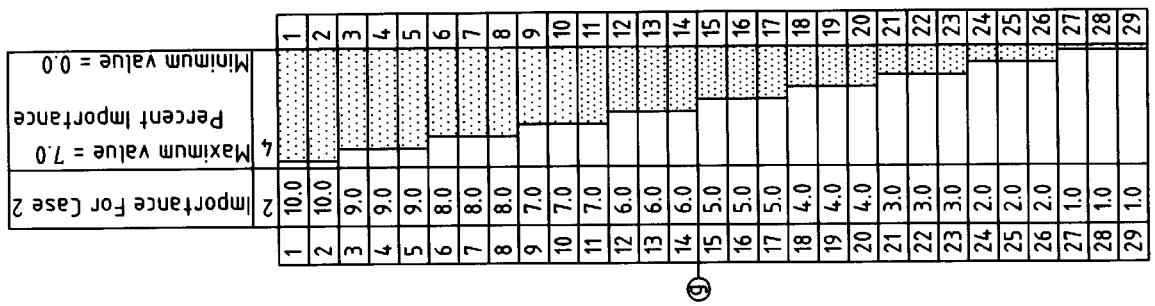

| | Importance For Case 2 | Maximum value = 7.0 Percent Importance Minimum value = 0.0 |
|---|---|---|
| 1 | 10.0 | |
| 2 | 10.0 | |
| 3 | 9.0 | |
| 4 | 9.0 | |
| 5 | 9.0 | |
| 6 | 8.0 | |
| 7 | 8.0 | |
| 8 | 8.0 | |
| 9 | 7.0 | |
| 10 | 7.0 | |
| 11 | 7.0 | |
| 12 | 6.0 | |
| 13 | 6.0 | |
| 14 | 6.0 | |
| 15 | 5.0 | |
| 16 | 5.0 | |
| 17 | 5.0 | |
| 18 | 4.0 | |
| 19 | 4.0 | |
| 20 | 4.0 | |
| 21 | 3.0 | |
| 22 | 3.0 | |
| 23 | 3.0 | |
| 24 | 2.0 | |
| 25 | 2.0 | |
| 26 | 2.0 | |
| 27 | 1.0 | |
| 28 | 1.0 | |
| 29 | 1.0 | |

| | |
|---|---|
| 1 | <-Percent of follow-up data that can be accessed from the patient's home |
| 2 | <-Stroke volume when the patient is at rest |
| 3 | <-Number of therapeutic events that are annunciated to the patient |
| 4 | <-Time required to acquire data from the device |
| 5 | <-Number of parameters that can be programmed at a remote location |
| 6 | <-Percent of therapies that can be delivered while the device is being accessed |
| 7 | <-Time/steps to determine a patients pacing threshold |
| 8 | <-Cardiac output that can be delivered in response to metabolic demand |
| 9 | <-Time required to assess the patients status from a remote location |
| 10 | <-Percent of required unscheduled follow-ups annunciated to the patient |
| 11 | <-Time required for the user to determine/take the next programming step |
| 12 | <-Percent of atrial fibrillation episodes that can be terminated |
| 13 | <-Number of hemodynamic parameters surrounding an episode that are known |
| 14 | <-Time/steps to obtain the patients history of previous follow-ups |
| 15 | <-Time/steps required to determine a patients defibrillation threshold |
| 16 | <-Number of drug sensitive parameters the device can recognize and adapt to |
| 17 | <-Number of parameters measured that predict occurrence of a future event |
| 18 | <-Number of therapies modulated by hemodynamic status |
| 19 | <-Percent of therapies delivered when the heart is depolarized or unexcited |
| 20 | <-Percent of therapies that inadvertently cause AF |
| 21 | <-Percent of VT episodes correctly discriminated from SVT episodes |
| 22 | <-Number of times painful stimuli are required to revert patient |
| 23 | <-Number of times uncomfortable stimuli are required to test the device |
| 24 | <-Time/steps required to troubleshoot the system |
| 25 | <-Percent of arrhythmias that can be prevented |
| 26 | <-Time/steps to obtain an acceptable defibrillation threshold |
| 27 | <-Time the patient is symptomatic |
| 28 | <-Number of incorrect diagnoses that can be derived |
| 29 | <-Ratio of useable stored energy to power consumption |

| | | 1 | 2 |
|---|---|---|---|
| Percent of follow-up data that can be accessed from the patient's home <- | 1 | 7.93 | |
| Stroke volume when the patient is at rest <- | 2 | 7.03 | |
| Number of therapeutic events that are annunciated to the patient <- | 3 | 6.26 | |
| Time required to acquire data from the device <- | 4 | 5.71 | |
| Number of parameters that can be programmed at a remote location <- | 5 | 5.28 | |
| Percent of therapies that can be delivered while the device is being accessed <- | 6 | 5.16 | |
| Time/steps to determine a patients pacing threshold <- | 7 | 5.08 | |
| Cardiac output that can be delivered in response to metabolic demand <- | 8 | 4.69 | |
| Time required to assess the patients status from a remote location <- | 9 | 4.56 | |
| Percent of required unscheduled follow-ups annunciated to the patient <- | 10 | 4.36 | |
| Time required for the user to determine/take the next programming step <- | 11 | 4.25 | |
| Percent of atrial fibrillation episodes that can be terminated <- | 12 | 4.06 | |
| Number of hemodynamic parameters surrounding an episode that are known <- | 13 | 3.84 | |
| Time/steps to obtain the patients history of previous follow-ups <- | 14 | 3.46 | |
| Time/steps required to determine a patients defibrillation threshold <- | 15 | 3.03 | |
| Number of drug sensitive parameters the device can recognize and adapt to <- | 16 | 3.00 | |
| Number of parameters measured that predict occurrence of a future event <- | 17 | 2.78 | |
| Number of therapies modulated by hemodynamic status <- | 18 | 2.72 | |
| Percent of therapies delivered when the heart is depolarized or unexcited <- | 19 | 2.19 | |
| Percent of therapies that inadvertently cause AF <- | 20 | 2.16 | |
| Percent of SVT episodes correctly discriminated from VT episodes <- | 21 | 2.12 | |
| Number of times painful stimuli are required to revert the patient <- | 22 | 1.96 | |
| Number of times uncomfortable stimuli are required to test the device <- | 23 | 1.54 | |
| Time/steps required to troubleshoot the system <- | 24 | 1.49 | |
| Percent of arrhythmias that can be prevented <- | 25 | 1.48 | |
| Time/steps to obtain an acceptable defibrillation threshold <- | 26 | 1.45 | |
| Time the patient is symptomatic <- | 27 | 1.09 | |
| Number of incorrect diagnoses that can be derived <- | 28 | 0.85 | |
| Ratio of useable stored energy to power consumption <- | 29 | 0.48 | |
| | | 1 | 2 |
| | Normalized Importance | | |
| | Maximum value = 7.9 | | |
| | Normalized Importance | | |
| | Minimum value = 0.5 | | |

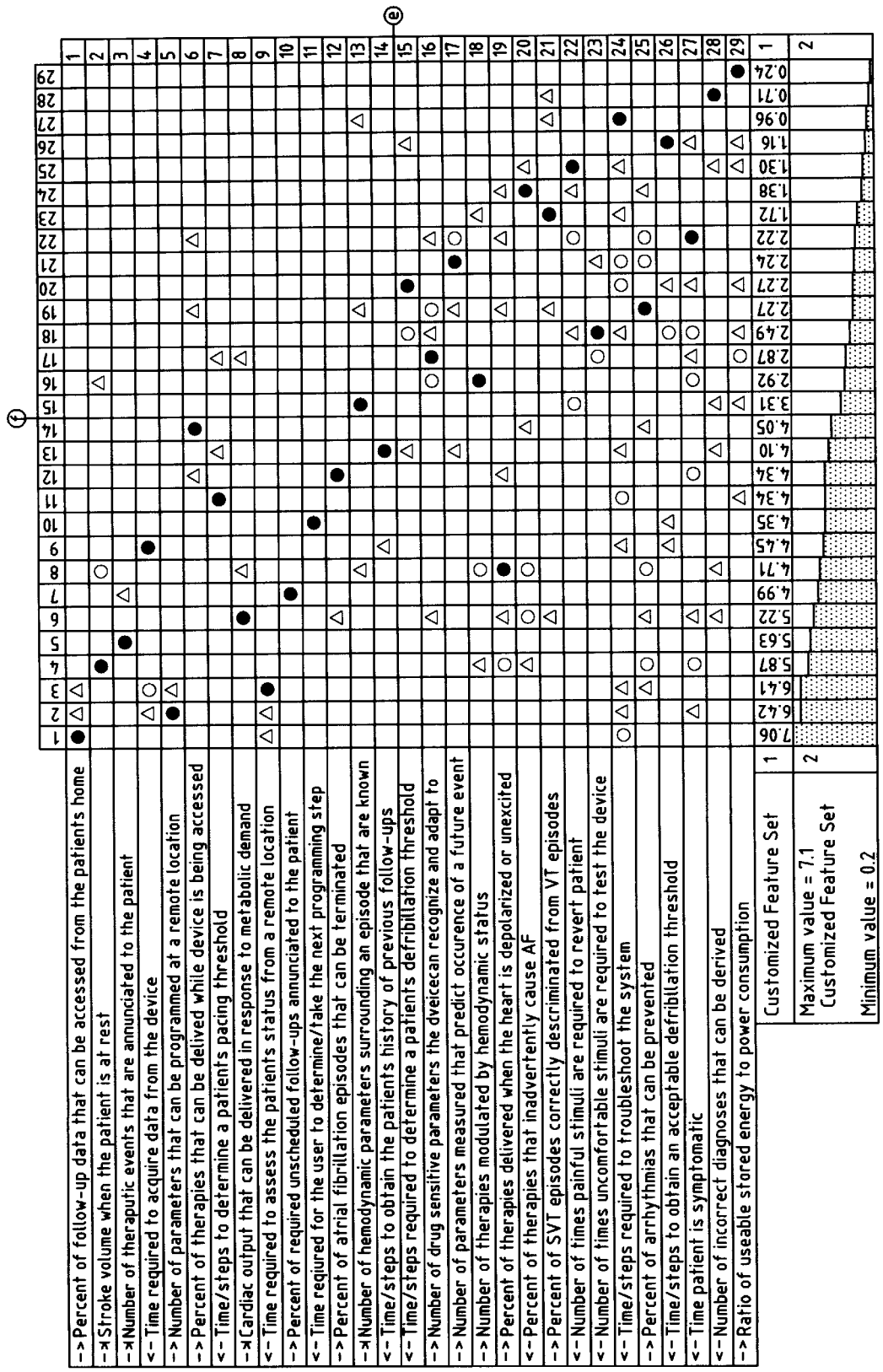
FIG. 17a Feature Set Customization, Case 2

FIG. 17b

| | Customization Value, Case 2 | Maximum value = 10.0 | Customization Value, Case 2 | Minimum value = 0.0 |
|---|---|---|---|---|
| 1 | 7.93 | | | |
| 2 | 7.03 | | | |
| 3 | 6.26 | | | |
| 4 | 5.71 | | | |
| 5 | 5.28 | | | |
| 6 | 5.16 | | | |
| 7 | 5.08 | | | |
| 8 | 4.69 | | | |
| 9 | 4.56 | | | |
| 10 | 4.36 | | | |
| 11 | 4.25 | | | |
| 12 | 4.06 | | | |
| 13 | 3.84 | | | |
| 14 | 3.46 | | | |
| 15 | 3.03 | | | |
| 16 | 3.00 | | | |
| 17 | 2.78 | | | |
| 18 | 2.72 | | | |
| 19 | 2.19 | | | |
| 20 | 2.16 | | | |
| 21 | 2.12 | | | |
| 22 | 1.96 | | | |
| 23 | 1.54 | | | |
| 24 | 1.49 | | | |
| 25 | 1.48 | | | |
| 26 | 1.45 | | | |
| 27 | 1.09 | | | |
| 28 | 0.85 | | | |
| 29 | 0.48 | | | |

| 1 | Activate transtelephonic monitoring system |
| 2 | Activate transtelephonic remote programming feature |
| 3 | Enable remote access to device data using RF data transfer |
| 4 | Activate monitoring to improve stroke volume when the patient is at rest |
| 5 | Activate annunciation feature to inform patient of impending therapeutic events |
| 6 | Activate monitoring of left and right ventricles to detect metabolic conditions |
| 7 | Activate annunciation mechanism to inform patient of a required doctor visit |
| 8 | Enable access to data in the atrium to determine if the heart is depolarized |
| 9 | Enable high speed telemetry capability |
| 10 | Activate programming guidance format |
| 11 | Enable automated pacing threshold detection |
| 12 | Activate shock therapy mechanism for Atrial Fibrillation |
| 13 | Activate storage and recall of follow-up data that is stored in the device |
| 14 | Enable therapy delivery algorithm to ensure therapy presides over testing |
| 15 | Activate ongoing monitoring/storing of hemodynamic parameters |
| 16 | Enable multiple ventricle therapy delivery capability |
| 17 | Enable algorithm to monitor adapt function and presence to accommodate |
| 18 | Enable testing algorithm based on shock success and shock impedence |
| 19 | Enable monitoring of QT interval and T wave amplitude to prevent arrhythmias |
| 20 | Enable the automatic detection of the patients defibrillation threshold |
| 21 | Activate ongoing comparison of patient data to historical database to find trend |
| 22 | Activate ventricular rate stabilization algorithm during Atrial Fibrillation |
| 23 | Enable comparison of respiration rate and tidal volume for a SVT or VT episode |
| 24 | Enable synchronization of shocks to ventricle when AV delay less than 100ms |
| 25 | Activate the improved noise algorithm to better access latter required therapy |
| 26 | Enable measurement of mixed capacitor biphasic waveforms to set threshold |
| 27 | Activate self diagnostic, error detection and recording algorithm |
| 28 | Activate patient diagnosis algorithm to measure and compare the diagnostic data |
| 29 | Activate the reduce monitoring current algorithm to increase device longevity |

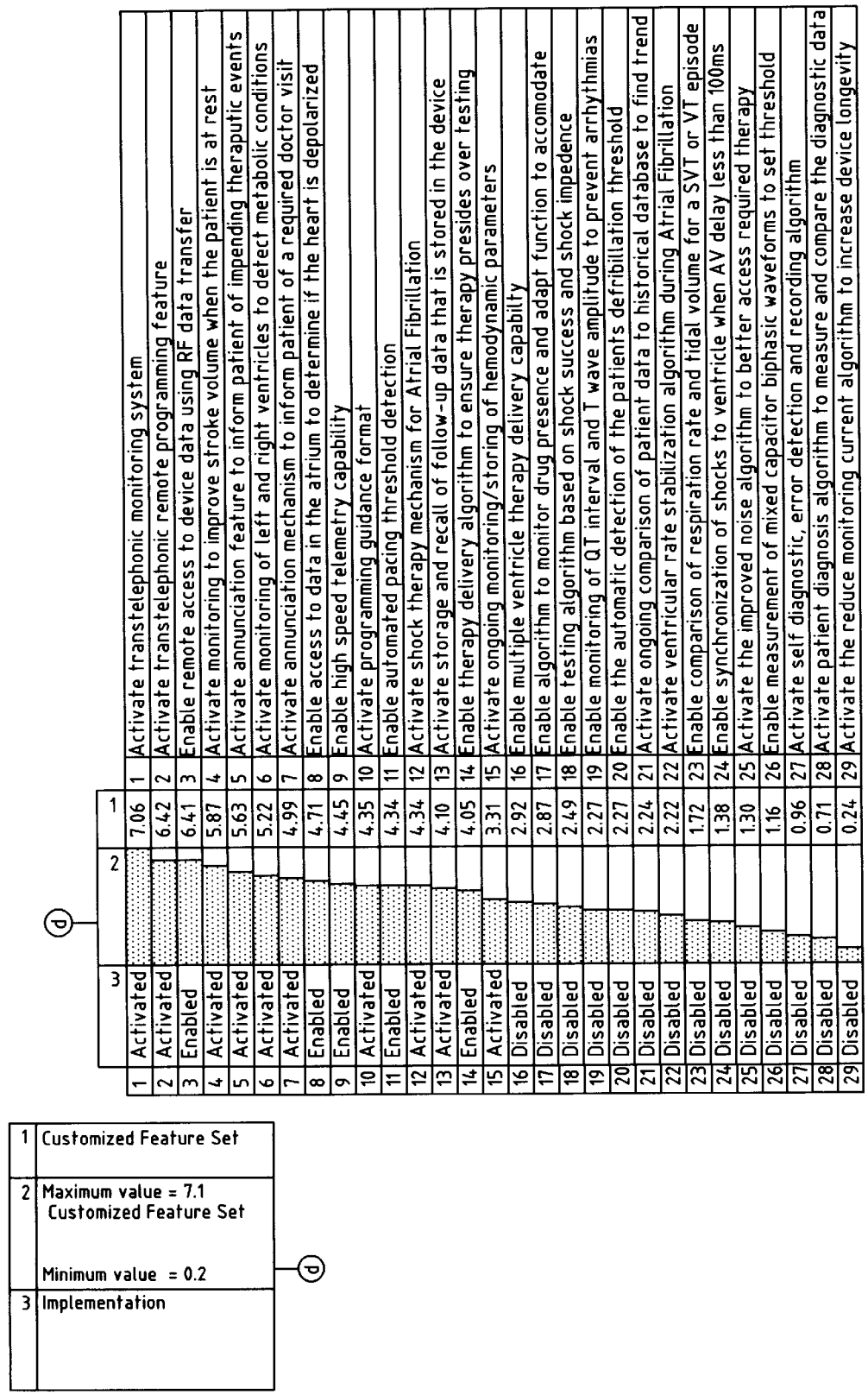

6,085,165

PROCESS AND SYSTEM FOR OUTCOME BASED MASS CUSTOMIZATION

This application is a continuation-in-part of application Ser. No. 08/716,948 filed on Sep. 20, 1996, and claims the benefit of U.S. Provisional Application Ser. No. 60/025,186, filed Sep. 12, 1996.

BACKGROUND OF THE INVENTION

1. Field of the Invention

The present invention relates generally to a computer based data management and configuration system for software driven devices, and more particularly, to a software based configuration and optimization system that takes input from users relating to specific desired outcomes for a specific electronic device, system or application (hereinafter "electronic device"), prioritizes the desired outcomes, calculates an optimized feature configuration that best achieves the user's desired outcomes, and automatically configures a configurable electronic device by adjusting software driven features to a customized configuration based on the user's prioritized desired outcomes.

2. Description of the Prior Art

Currently with mass produced electronic devices, a user must accept the apparatus or application as configured by the manufacturer and/or as sold by a retailer, regardless of the user's particular application or environment of use. Often times the user must pay for unused options; other times the user finds that desired options are not available; still other times options associated with the device are not optimized for the user's needs.

In certain limited situations, the customer may be able select specific features which the manufacturer or distributor then programs into the device in an attempt to provide the customer with a specific product configuration. This method of customization, however, is time consuming, inefficient, and thus, rarely used. Furthermore, such prior art customization methods focus on specific device features and are not driven by the customer's desired outcomes.

Accordingly there exists a need for a system that can easily tailor mass produced electronic devices by adjusting software driven parameters based on prioritized desired outcomes associated with a particular user or set of users.

SUMMARY OF THE INVENTION

The present invention is a software based configuration and optimization system that takes input from users relating to specific desired outcomes for a specific electronic device, prioritizes the desired outcomes, and automatically configures the device, with customized features according to the prioritized outcomes desired by the user.

For any given application, the present invention contemplates the use of "desired outcome" data obtained by conducting statistically valid qualitative research, which data identifies and establishes desired outcomes relating to the application. As used herein, the term "desired outcome" means that which is valued by a specific group relative to a particular application. Through statistically valid research techniques, a finite set of desired outcomes is established, whereby each desired outcome is reduced to a short, concise written statement. According to the present invention, proven and statistically valid research and data gathering methods, including the use of neurolinguistic programming ("NLP"), are used to identify and establish a finite set of desired outcomes for any given device. By way of example, desired outcomes in connection with a medical defibrillator device may relate to reducing the frequency of device replacement, or enabling device programming from a remote location.

For each desired outcome identified for a particular device there is defined a predictive metric which strongly predicts satisfaction of a particular desired outcome. As used herein the term "predictive metric" shall refer to a parameter that can be measured and controlled, which parameter relates directly to the satisfaction of a desired outcome. Predictive metrics are each also reduced to a short concise written statement. It is important to note that each predictive metric may also positively, or negatively, predict satisfaction of multiple desired outcomes. Accordingly, each predictive metric is assigned a predictive relationship value for each desired outcome, which value indicates the degree to which a predictive metric predicts satisfaction of a desired outcome. In addition, each predictive metric has a predetermined and corresponding customization feature assigned thereto for the specific electronic device. The customization feature includes information for customizing the specific application by adjustment of certain device parameters.

In a preferred embodiment, the desired outcomes and corresponding predictive metrics are stored in a software format for presentation to, and use by, a user to optimize and adjust configurable device features. The desired outcomes applicable to a particular electronic device are presented to the user for allowing the user to rank the importance of the desired outcomes. Thus, the user is able to prioritize the set of desired outcomes which relate to the user's needs, or specific device application, by ranking those desired outcomes that are important to the user highly, while ranking those desired outcomes that are of lesser importance lower.

A subroutine including an algorithm aligns the desired outcomes in prioritized order based on user inputs and further uses matrix analysis to realign and prioritize the corresponding predictive metrics, based on the desired outcome prioritization and the predictive relationship value assigned to each predictive metric for each desired outcome. Accordingly, the predictive metrics are prioritized in terms of normalized importance whereby the resulting predictive metric prioritization identifies those predictive metrics that predict satisfaction of a disproportionate share of value as defined by the desired outcome prioritization. In addition, predetermined customizable features and customization relationship values, have been assigned to each predictive metric such that the calculations yield a set of application customization features for the purpose of customizing a specific electronic device to an optimized configuration based on the user's desired outcome preferences and prioritization.

The electronic device customization values are then transferred to the device via any suitable data transfer hardware such as a computer data port, modem, or radio frequency or infra-red signal. The electronic device uses the customization values to adjust software driven features such that the device becomes configured to function in an optimized manner based on the user inputs. In addition, the electronic device may store customization values for multiple users such that customization values previously transferred can be recalled to alter the configuration of the device to suit a particular user.

As is now apparent, the present invention provides a process and system for customizing mass produced electronic devices, including products and services, by altering software driven parameters based on user desired outcomes.

Accordingly, it is an object of the present invention to provide a system and method for customizing electronic products and/or services.

An additional object of the present invention is to provide a system and method for customization of electronic devices based on user desired outcomes.

Yet another object of the present invention is to provide a software product, including desired outcome data for one or more applications, which enables the user to prioritize device specific desired outcomes thereby yielding a set of customization values for output via any suitable data transfer means to a software driven electronic device, which electronic device uses the customization values to adjust certain parameters thereby achieving an optimized configuration.

In accordance with these and other objects which will become apparent hereinafter, the instant invention will now be described with particular reference to the accompanying drawings.

BRIEF DESCRIPTION OF THE DRAWINGS

FIG. 1 is a block diagram of one embodiment of the present invention.

FIG. 2 is a flow chart of the operation of one embodiment of the present invention.

FIG. 3 illustrates an example of an alternate embodiment of the present invention relating to customization of a portable radio.

FIG. 4 illustrates an example of an alternate embodiment of the present invention relating to customization of a computerized trading system.

FIGS. 7a and 7b represent data for a medical defibrillator including desired outcomes, predictive metrics, and predictive relationship values.

FIGS. 9a and 9b represent data including the prioritized desired outcomes found in FIG. 8 and the corresponding prioritization of predictive metrics in terms of normalized importance, which prioritization is based on desired outcome prioritization and predictive relationship values, for a first example (Case 1).

FIG. 10 represents an enlarged view of the prioritized predictive metrics found in FIG. 9.

FIGS 11a and 11b represent further data for a medical defibrillator including predictive metrics, corresponding features, and predictive metric-feature relationship values.

FIGS. 12a and 12b represent data including the prioritized predictive metrics found in FIGS. 9 and 10, and the corresponding prioritization of features in terms of the customization values, which prioritization is based on predictive metric prioritization and relationship values for a first example (Case 1).

FIG. 13 represents data including the prioritized features, feature customization values, and implementation commands for a first example (Case 1).

FIGS. 15a and 15b represent data including the prioritized desired outcomes found in FIG. 14, and the corresponding prioritization of predictive metrics in terms of normalized importance, which prioritization is based on desired outcome prioritization and predictive relationship values, for a second example (Case 2).

FIG. 16 represents an enlarged view of the prioritized predictive metrics found in FIG. 15.

FIG. 17 represents data including the prioritized predictive metrics found in FIGS. 15 and 16, and the corresponding prioritization of features in terms of the customization values, which prioritization is based on predictive metric prioritization and relationship values for a second example (Case 2).

FIG. 18 represents data including the prioritized features, feature customization values, and implementation commands for a second example (Case 2).

DESCRIPTION OF THE PREFERRED EMBODIMENTS

Figure 5:
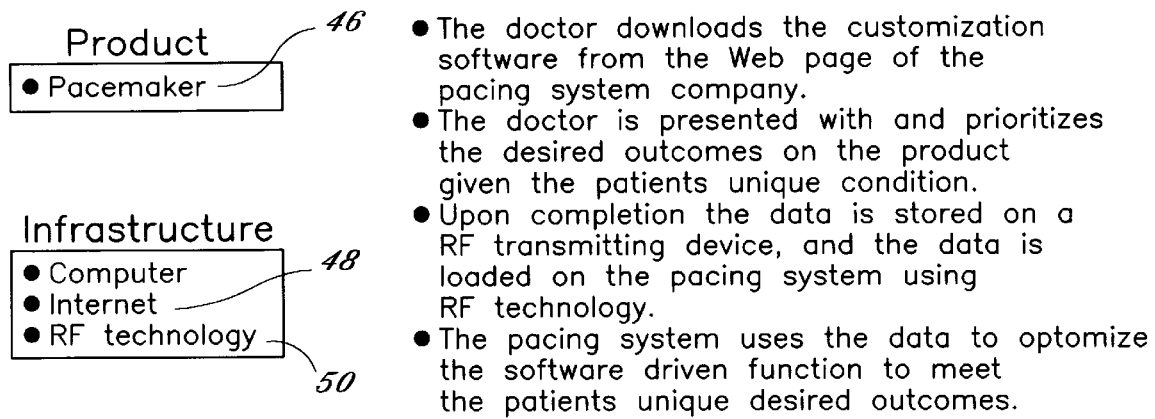
FIG. 5 illustrates an example of an alternate embodiment of the present invention relating to customization of a medical heart defibrillator.

Referring now to the Figures, and in particular FIG. 1, one embodiment of the present invention is herein described in block diagram format. As reflected in block 2, desired outcomes on a specific electronic device, which have been previously identified through research, are prioritized by the owner/user or appropriate party. Software screens may be used for data input enabling access by the user using a computer, as illustrated in block 4. As discussed above, each desired outcome has a corresponding predictive metric which strongly predicts satisfaction of the outcome. The specific, predictive, design level metrics are prioritized, by the software, based on the desired outcome prioritization, so as to establish a set of customization values for the purpose of configuring an electronic device (e.g. product or service) as illustrated in block 6. As reflected in block 8, the data is stored in a data storage and transfer device such as a personal computer (PC) or a device that enables data transfer via IR, RF, card and/or disk technology.

The data is transferred to the electronic device through a suitable data transfer interface between the data storage device (e.g. PC) and the electronic device, as described in block 10. For example, the data may be transferred to, and read by, the electronic device using an input port, interface card, diskette, RF or IR interface or any other suitable data transfer hardware as illustrated in block 12. With reference to block 14, the device, which can be, but is not limited to, a portable radio, pacemaker, car, appliance, or on-line service will adjust its software driven device parameters, based on the inputs, and provide the user with an electronic device having features customized to suit the user's desired outcomes. The customization instructions are executed by the electronic device via a mechanism such as a microchip, microprocessor, or microcontroller that can read and execute instructions as reflected in block 16. As is apparent, the invention contemplates a system which includes data and computer code for performing the above-referenced tasks to develop a set of customization instructions, and an electronic device capable of receiving the customization instructions and adjusting certain features accordingly.

Referring now to FIG. 2, the basic system level logic for the present invention is shown. The user 18 is provided with access to the customization software through a data input device such as a computer keyboard 20. The customization software 22 presents the user with the specific predetermined desired outcomes, which may be functional or ergonomic based, as gathered for that unique electronic device.

The user rates the importance (and optionally the current level of satisfaction) of each desired outcome as presented by the software. Using matrix analysis and a mathematical algorithm, the software prioritizes (based on the user selected desired outcome importance) a list of predictive metrics that have been previously defined for that unique electronic device. Predetermined customization values are automatically assigned to each predictive metric given its priority.

The customization values are stored in a data storage device 24 such as a hard drive, in any suitable language that can be accessed and understood by an electronic device to be customized. The customization values are transferred to the electronic device to be customized using a data transfer device 26 such as a data port, modem, smart card, RF interface, or IR interface. The electronic device has the capability to access, read 28, and use the transferred data to adjust its software driven features to deliver the function or level of function that will enable that user to achieve the desired outcomes that are important to the user 30. The electronic device may be designed to store the customization values for multiple users so that features may be quickly modified by the device to satisfy the unique desired outcomes of multiple users by selective recall of the values associated with a particular user.

Referring now to FIG. 3, an example is shown for the present invention in the specific embodiment and electronic device comprising a portable radio 32. The user loads a diskette 34 into a computer 36 and accesses the customization software. The user is presented with, and prioritizes, the desired outcomes on the electronic device, which desired outcomes have been obtained through statistically valid research. The user rates the importance (and optionally the current level of satisfaction) of each of the desired outcomes as requested by the software. Using matrix analysis and a mathematical algorithm, the software prioritizes a list of predictive metrics that have been previously defined for that unique application. Predetermined customizable features values are automatically assigned to each predictive metric. Accordingly, a set of data which corresponds to an organized set of instructions for customizing features of the specific electronic device is created. Upon completion the customization data is downloaded to the radio 32 via an interface cable 38, or any other suitable data transfer hardware. The radio 32 uses the data to optimize its software driven functions to meet the user's unique desired outcomes.

Referring now to FIG. 4, an example is shown for the present invention in the specific embodiment wherein the electronic device comprises a commodity trading service 40. In this example the trader accesses the customization software from the Web page, or any other suitable source, of the commodity trading company 42. The user is presented with and prioritizes the desired outcomes on a commodity trading service. Upon completion, the data is sent to the company location and is stored on the company's computerized trading services system. When the trader calls the service 44 and enters a special code, the computerized trading system is optimized to satisfy the unique desired outcomes of the trader.

Referring now to FIG. 5, an example is shown for the present invention wherein the specific embodiment of the electronic device is a medical heart defibrillator 46. In this example the doctor obtains customization data from any suitable source such as downloading customization software from the Web page of the manufacturer or distributor of the device 48. The doctor is presented with, and prioritizes, the desired outcomes on the defibrillator given the patient's unique condition and the treatment strategy selected. Upon completion, the data is transferred to the device by a suitable data transfer technology such as RF technology 50, and the device uses the data to optimize software driven functions to meet the selected desired outcomes. The example of FIG. 5, shall be further described below.

Figure 6:
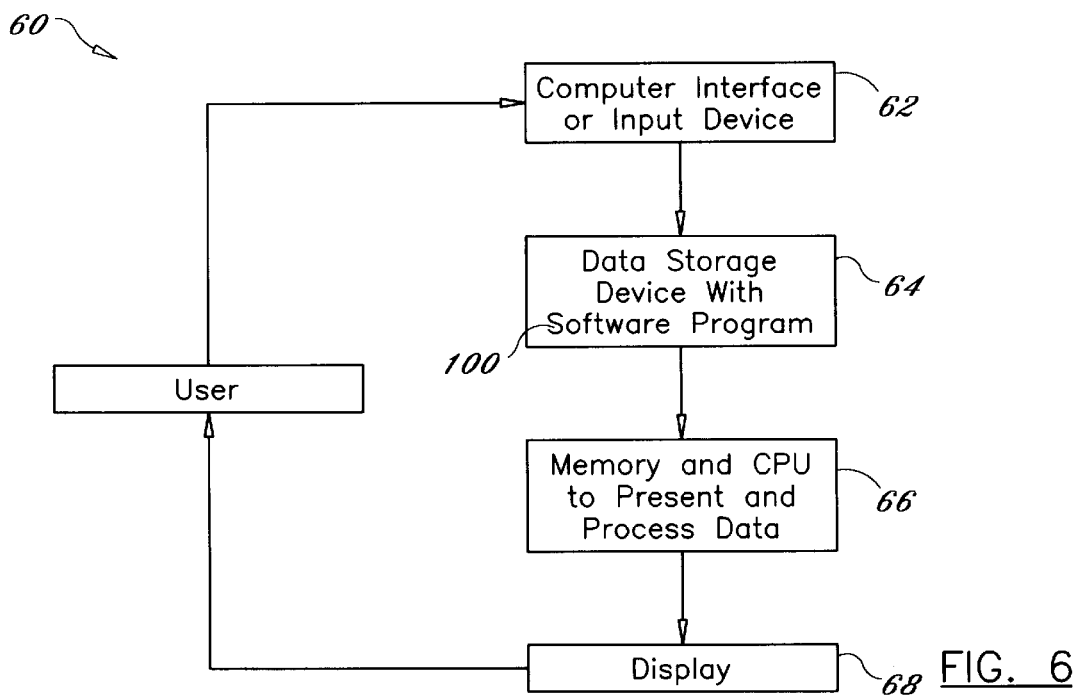
FIG. 6 is a basic system level block diagram for the instant invention.

With reference to FIG. 6, the basic system of the instant invention is shown and generally referenced as 60. The basic system for the present invention includes a user interface, a computer interface 62, such as a keyboard or any other suitable user interface, a data storage device 64 whereon various data including software having subroutines and algorithms for carrying out the present invention, memory and central processing unit ("CPU") or other suitable processing architecture 66, and display 68.

I. Defibrillator Example

As previously discussed, the instant invention contemplates establishing a finite set of desired outcomes in the form of concise written statements for each electronic device by conducting statistically valid research. For any given electronic device there is a finite set of desired outcomes. Specifically, for each device (e.g. product or service) research is conducted by experts by telephonic or personal interviews, or any other suitable technique which results in statistically valid research. Once obtained, the specific desired outcome data relating to the electronic device is stored in a computer data base.

Figure 7A:
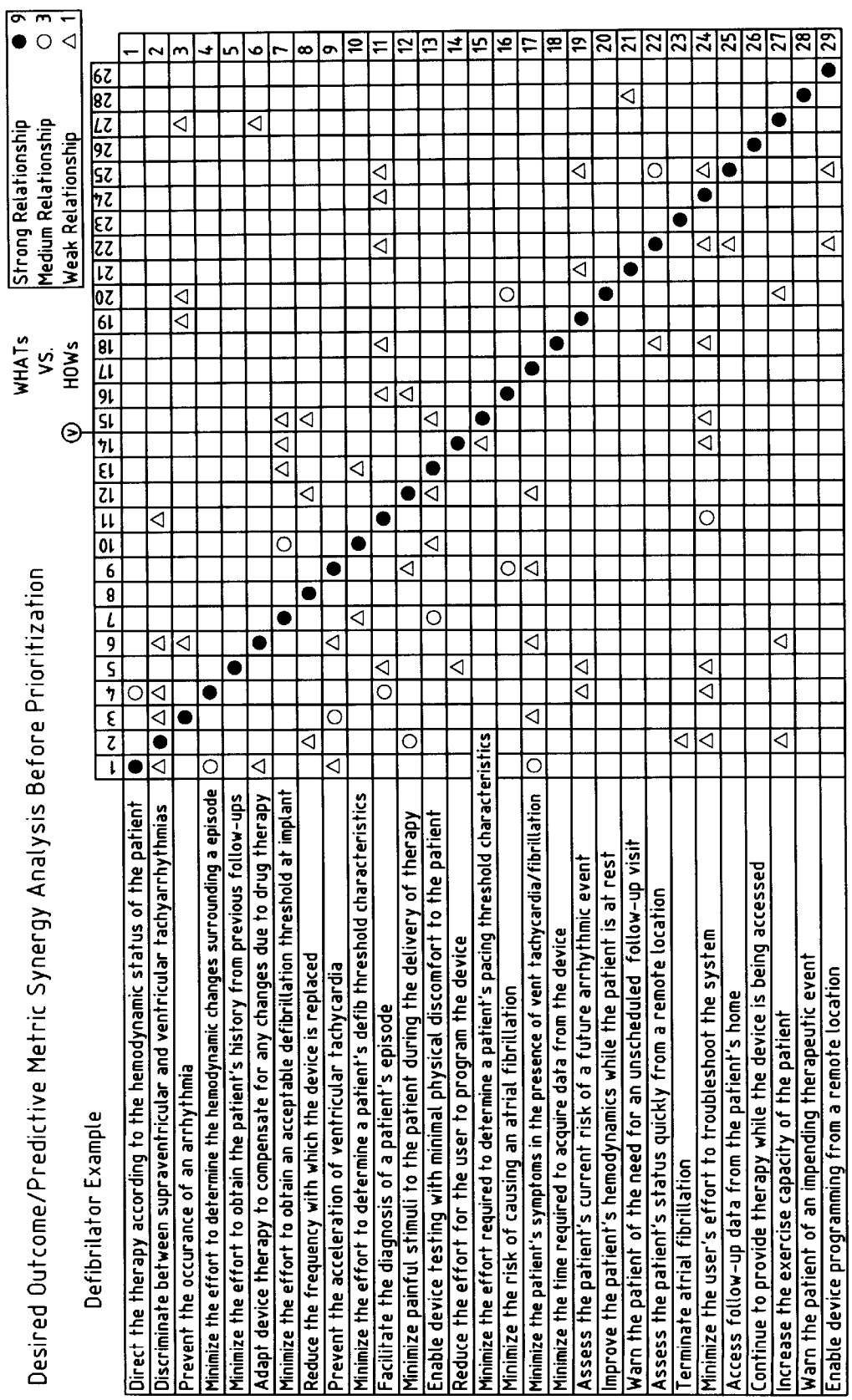

For example, as illustrated in FIGS. 7 through 18 is specific data relating to the defibrillator example discussed above, and referenced at FIG. 5. By way of example, desired outcomes for a defibrillator are seen in FIG. 7 along the left hand column (Nos 1–29). Specifically, the example found shown in FIG. 7 includes twenty-nine desired outcomes in the form of written statements. An important aspect of the present invention is that the set of desired outcomes for a given electronic device are constant and only the prioritization changes, as in the present example, from patient to patient. However, it is important to note that desired outcome prioritization may also vary over time for the same patient as the patient's condition and/or treatment strategy changes.

The present invention further contemplates the establishment of a finite set of predictive metrics for a given electronic device. Predictive metrics are measurable parameters that predict satisfaction of at least one desired outcome and also each take the form of a short, concise written statement. A predictive metric is developed for each desired outcome. The predictive metrics are formulated by market or industry research, and, once formulated, are organized into a computer database. Once collected and organized, the data is loaded into software for use with the present invention. Regarding the present defibrillator example, the predictive metrics corresponding to the desired outcomes are reflected across the top (Nos. 1–29 from left to right) in FIG. 7.

It is important to note that a single predictive metric is defined for each desired outcome; however, as each metric may predict, to some extent, the satisfaction of more than one desired outcome(s), each metric is assigned a predictive relationship value for each desired outcome. The predictive relationship values depend upon the degree to which that metric predicts satisfaction of a given desired outcome. These assigned predictive relationship values are selected and stored prior to delivery to the user and are constants that do not vary over time. Note that in FIG. 7, for each desired outcome (Nos. 1–29 down the left hand column), there is a corresponding predictive metric (Nos. 1–29 across the top) established which strongly predicts (strength of prediction indicated by solid circle) satisfaction of that particular desired outcome. In addition, to the extent applicable, each metric is assigned a predictive relationship value relative to each of the remaining desired outcomes. In the data found in FIG. 7 the predictive relationship values for each predictive metric and each desired outcome combination are indicated by strong, moderate, and weak indicators which are graphically represented by a solid circle, a circle, and a triangle respectively, and which graphics correspond to numerical values (9, 3, and 1, respectively). The assignment of these predictive relationship values results in the matrix represented by FIG. 7. Thus, the data found in the matrix in FIG. 7 is constant for all defibrillator applications, and only the prioritization of desired outcomes will change. While the preferred embodiment contemplates use of the above-referenced predictive relationship values, any suitable values are within the scope of the present invention.

The present invention contemplates presenting the desired outcome data to a doctor whereby the doctor is able to prioritize the desired outcomes, such as by importance based prioritization. Accordingly, the doctor assigns each desired outcome an importance rating (e.g. from 1 to 10) depending upon the importance of each desired outcome relative to the patient and selected treatment strategy. Once the importance ratings have been assigned by the doctor, a computer software algorithm prioritizes the desired outcomes in order of importance as seen in FIG. 8.

The present invention contemplates that the prioritizing of the desired outcomes may be accomplished by any suitable prioritization method, and that criteria other than, or in addition to, importance may be used to prioritize the desired outcomes. For example, it may be desirable for the user to input price constraint data such that the invention may discriminate between various features for satisfying certain desired outcomes based on cost. Accordingly, as used herein, the term "importance" should be broadly construed to include any suitable criteria which enables the user to prioritize desired outcomes.

Thus, in the instant example the doctor has determined that, for the particular patient, it is more important to: reduce the frequency with which the device is replace (priority rank 1); facilitate the diagnosis of a patient's episode (priority rank 2) etc.; than it is important to: access follow-up data from the patient's home (priority rank 28); and, enable device programming from a remote location (priority rank 29). As is apparent, the above-referenced prioritization will vary from patient to patient. Furthermore, as a patient's condition changes the doctor may change the prioritization for the purpose of altering the configuration of the defibrillator as described in further detail below.

Figure 8:
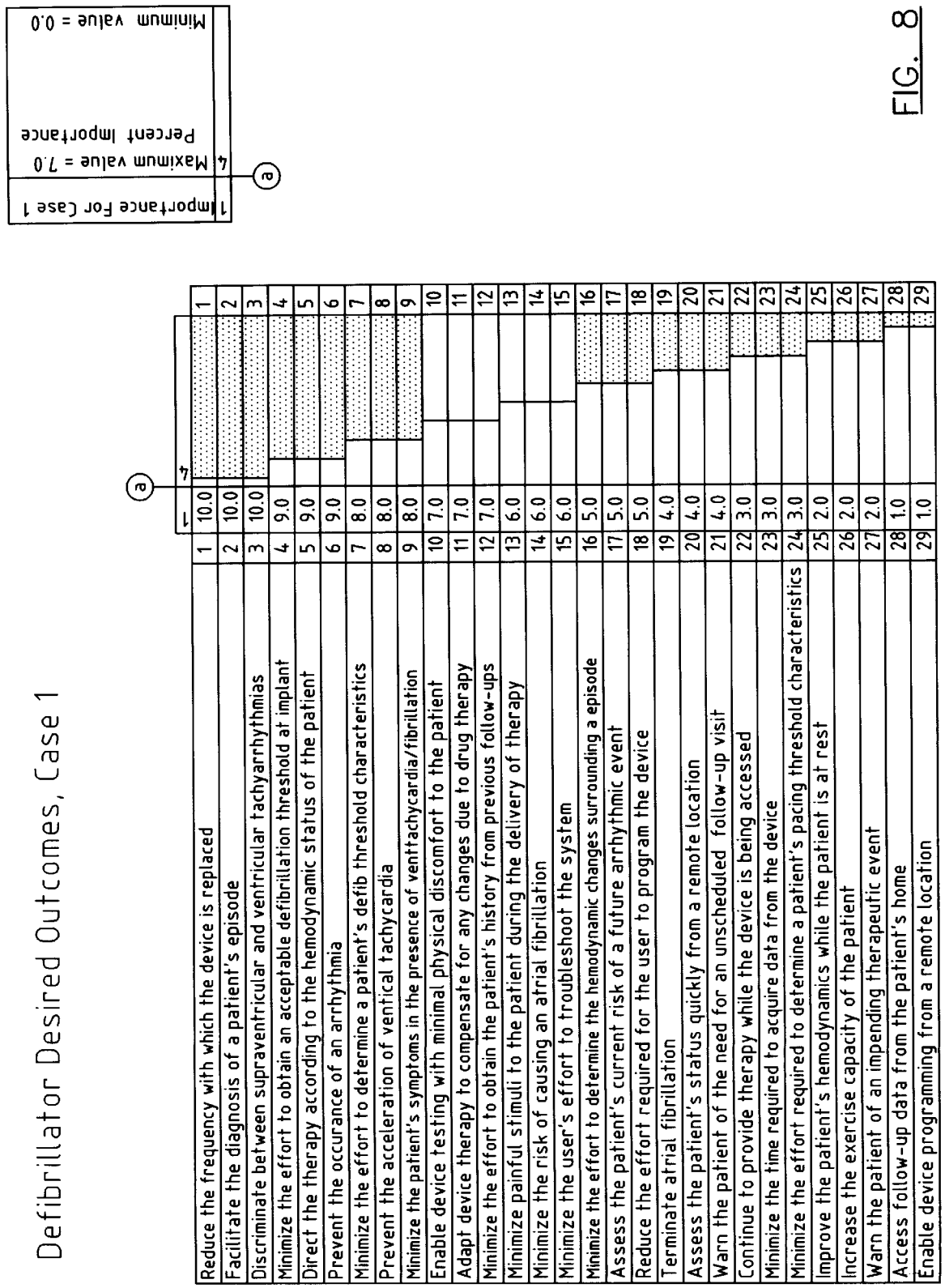
FIG. 8 represents data including the desired outcomes found in FIG. 7 prioritized by a doctor based on importance for a first example (Case 1).

Accordingly, once the user has prioritized the desired outcomes as reflected in FIG. 8, a computer subroutine calculates the normalized importance for each predictive metric as reflected in FIG. 9. The normalized importance values represent the strength of each predictive metric with respect to the degree to which the predictive metric predicts satisfaction of the prioritized desired outcomes. Accordingly, the predictive metrics may be prioritized according to normalized importance such that those predictive metrics which predict satisfaction of one or more highly ranked (e.g. highly important) desired outcomes are ranked high, while those predictive metrics which predict satisfaction of lower ranked (e.g. less important) desired outcomes are ranked lower.

By way of example, predictive metrics and the associated normalized importance values for the defibrillator example are represented in FIG. 9, both graphically (bar graph across the bottom), as well as numerically (from 6.96 to 0.50). FIG. 9 illustrates actual data wherein prioritized desired outcomes are listed down the left hand column (Nos. 1–29) and corresponding prioritized predictive metrics are listed from left to right across the top (Nos. 1–29). Note that the desired outcomes are shown in prioritized order (as prioritized by the user and reflected in FIG. 8) as represented by the assigned importance values shown along the extreme right hand column.

The reader should also note the normalized importance values for the pioritized predictive metrics are shown, both numerically and graphically, across the bottom of FIG. 9. With further reference to FIG. 9, the prioritizing of desired outcomes by the user in terms of importance results in the realignment of predictive metrics in terms of normalized importance which directly relates to the desired outcome prioritization and predictive relationship values. Accordingly, predictive metrics are realigned such that those metrics which strongly predict the satisfaction of one or more highly ranked desired outcomes are found to the left hand side of FIG. 9 (high normalized importance), while those predictive metrics which predict satisfaction of relatively low ranked desired outcomes are found to the right hand side of FIG. 9 (low normalized importance). Thus, as seen along the bottom row of FIG. 9, the prioritized predictive metrics reflect, from left to right, decreasing normalized importance.

FIG. 10 illustrates an enlarged view of the prioritized predictive metrics portion of the data represented in FIG. 9. The desired outcome based prioritization of the predictive metrics represented in FIG. 9 (Nos. 1–29) reflects that predictive metric No. 1 (number of therapies modulated by hemodynamic status) predicts satisfaction of the physicians importance indexed desired outcomes to a much larger extent that does predictive metric No. 29 (number of parameters that can be programmed at a remote location).

Figure 11A:
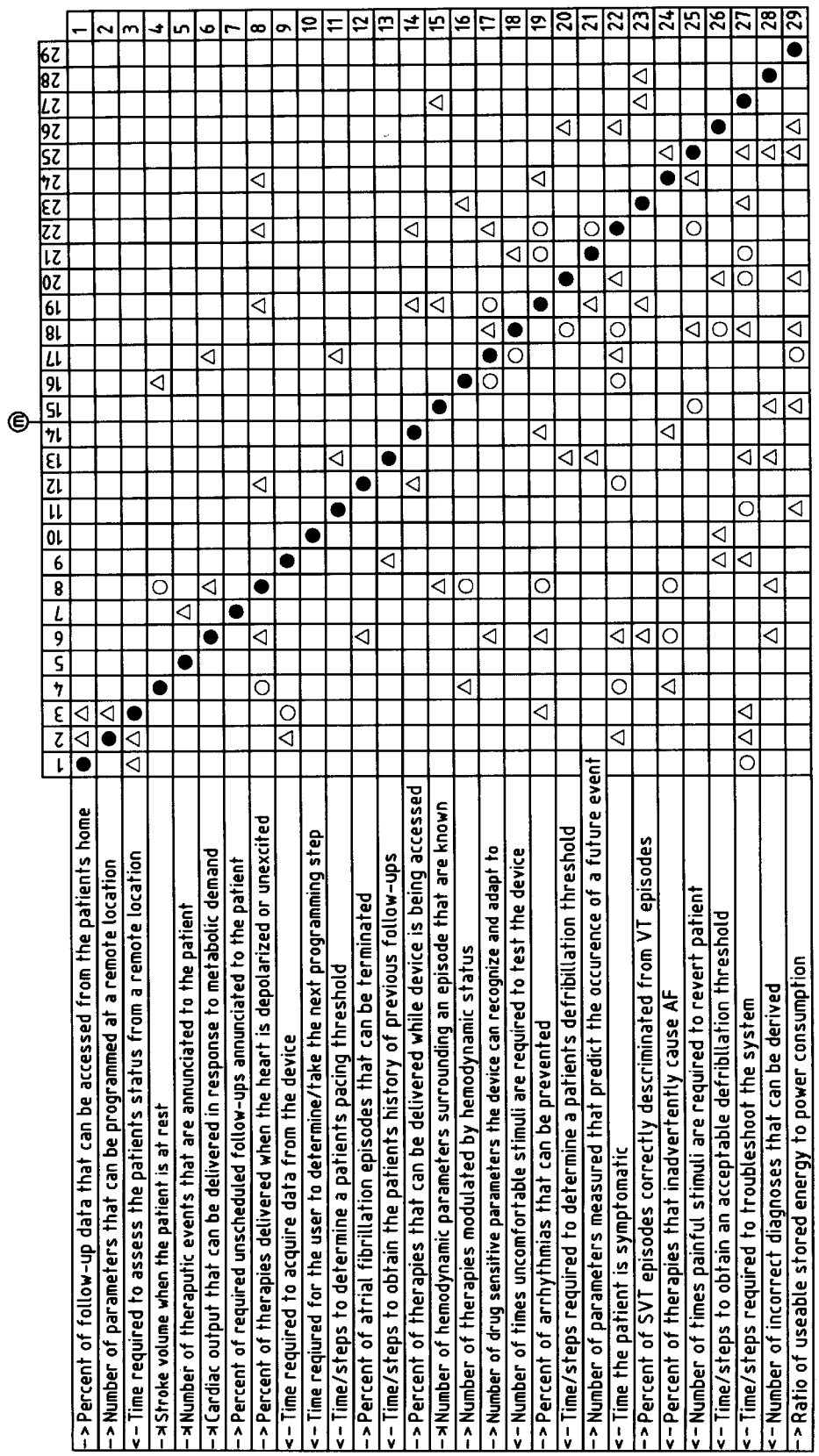
Figure 14:
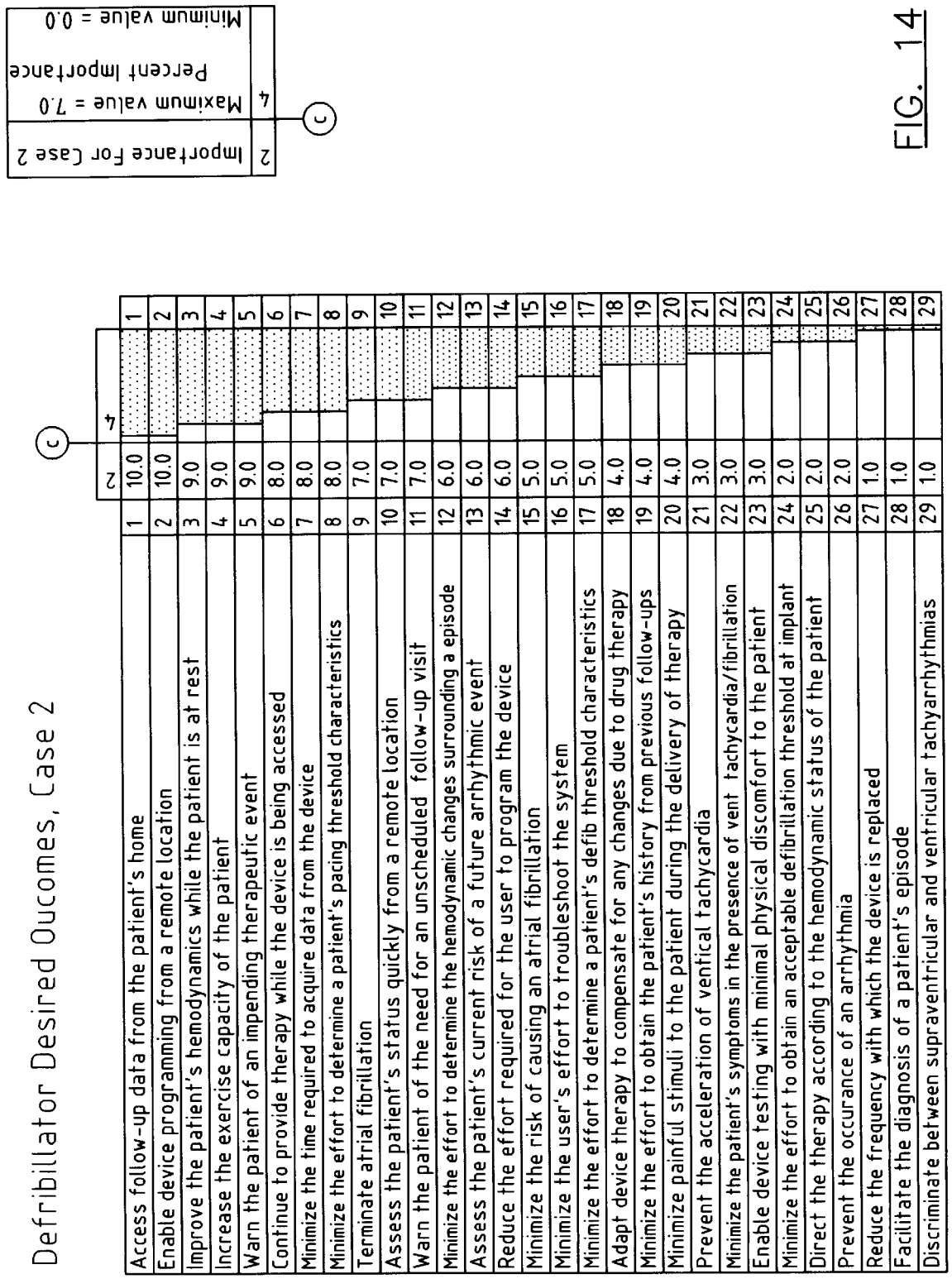
FIG. 14 represents data including the desired outcomes found in FIG. 7 prioritized by a doctor based on importance for a second example (Case 2).

As discussed above, the present invention further contemplates and includes specific data relating to specific electronic device customizable features assigned to each predictive metric as represented in FIG. 11. For each predictive metric the present invention contemplates a corresponding customizable feature, which feature utilizes instructions, which, when received by the electronic device, results in configuring the device in a specific manner (e.g. enabling, disabling, activating, deactivating, or modulating the feature between minimum and maximum settings). Accordingly, FIG. 11 illustrates non-prioritized features associated with the non-prioritized predictive metrics for the defibrillator device. Note that the invention further contemplates that each feature may, to some extent, positively or negatively relate to each of the remaining predictive metrics. Accordingly, as seen in FIG. 11 the relationships between each customization feature and each predictive metric, where applicable, are indicated by strong, moderate, and weak indicators which are graphically represented by a solid circle, a circle, and a triangle respectively, and which correspond to numerical values (9, 3, and 1, respectively). As is now apparent the data found in the matrix in FIG. 11 is arranged in a similar fashion as is the data found in the matrix in FIG. 7. In addition, the set of predictive metrics are constant as is the set of features and the relationship values between each metric and each feature. While the preferred embodiment contemplates use of the above-referenced relationship values, any suitable values are within the scope of the present invention.

Once the user has prioritized the desired outcomes, a subroutine analyzes and prioritizes the predictive metrics and corresponding customizable features thereby yielding a prioritized set of features including customization values and commands, as represented in FIG. 12, for configuring the electronic device's features. As is now apparent, calculations yield a customized feature set for the purpose of customizing the electronic device to an optimized configuration based on the user's desired outcome preferences. The customized feature set is then transferred to the electronic device to be customized via any suitable data transfer method using technology such as a computer data port, modem, or radio frequency or infra-red signal. The electronic device uses the information to set, adjust, or otherwise configure the device by adjustment of the device's configurable features in accordance with the customization data transferred thereto.

Thus, as represented in FIG. 13, implementation of the customized feature set for the defibrillator device by transferring customization data to the device results in the activation, deactivation, enablement, or disablement of specific features or capabilities of the defibrillator device. The invention contemplates that implementation may also include modulating certain features between minimum and maximum settings in addition to mere on/off settings.

Regarding the present example, the doctor's desired outcome prioritization resulted in prioritizing the predictive metrics such that highest ranked predictive metric was, e.g. "number of therapies modulated by hemodynamic status." Note, however, that the corresponding feature set customization value bearing the strongest relationship to the highest ranked metric is actually ranked No. 3 among the feature set customization values due to the fact that the invention contemplates that each customization value will bear a relationship to a plurality of metrics as discussed above. The net result, however, is that through implementation of the resulting customized feature set by transfer of customization data the electronic device becomes optimally configured based on the user's desired outcome prioritization.

The significance of the instant invention is further illustrated by comparison of the example discussed above and reflected through the data shown in FIGS. 7 through 13 (hereinafter "Case 1") with the example data represented in the data shown in FIGS. 14 through 18 (hereinafter "Case 2"). It is important to note, however, that the data found in FIG. 7 (desired outcomes/predictive metrics) and FIG. 11 (predictive metrics/features) provides the base data for both Case 1 and Case 2, the only difference being the importance based prioritization of the desired outcomes. With specific reference to FIG. 14, the Case 2 doctor has prioritized the desired outcomes for the defibrillator device differently than the prioritization for Case 1 represented in FIG. 8.

The difference in prioritization results from the doctor having assigned differing importance values to each desired outcome, which importance values are dictated by the patient's unique condition and treatment strategy. Accordingly, the desired outcomes for Case 2 result in a predictive metric prioritization that differs from the predictive metric prioritization of Case 1. See FIGS. 15 and 16 (Case 2) vs. FIGS. 9 and 10 (Case 1). Likewise, the predictive metric prioritization for Case 2 yields a correspondingly different customization feature set as represented in FIG. 17. Finally, implementation of the feature set represented in FIG. 17 is represented the customization data in FIG. 18.

As with the Case 1 example, the specific feature customization set represented in FIG. 18 is transferred to the defibrillator via any suitable data transfer technology such that the device loads the data into its internal electronic system and uses the data to configure software driven electronic features in accordance with the customization set thereby becoming customized in accordance with the physician's desired outcome's. As is apparent from a comparison of the implementation values found in FIGS. 13 and 18 the defibrillator device is configured differently for Case 1 than for Case 2.

The differences between Case 1 and Case 2 are summarized in the following tables:

| PRIORITIZATION | | | |
| --- | --- | --- | --- |
| CASE 1 Desired Outcomes Predictive Metrics Feature Customization | CASE 2 Desired Outcomes | CASE 2 Predictive Metrics | CASE 2 Feature Customization |
| 1 | 27 | 18 | 8 |
| 2 | 28 | 21 | 13 |
| 3 | 29 | 25 | 16 |
| 4 | 24 | 13 | 18 |
| 5 | 25 | 14 | 15 |
| 6 | 26 | 16 | 17 |
| 7 | 21 | 15 | 23 |
| 8 | 22 | 29 | 19 |
| 9 | 23 | 19 | 4 |
| 10 | 18 | 15 | 10 |
| 11 | 19 | 28 | 20 |
| 12 | 20 | 22 | 6 |
| 13 | 15 | 23 | 22 |
| 14 | 16 | 11 | 26 |
| 15 | 17 | 7 | 28 |
| 16 | 12 | 20 | 3 |
| 17 | 13 | 27 | 11 |
| 18 | 14 | 4 | 25 |
| 19 | 9 | 17 | 21 |
| 20 | 10 | 2 | 12 |
| 21 | 11 | 10 | 9 |
| 22 | 6 | 9 | 7 |
| 23 | 7 | 12 | 29 |
| 24 | 8 | 24 | 24 |
| 25 | 3 | 1 | 1 |
| 26 | 4 | 6 | 14 |
| 27 | 5 | 8 | 27 |
| 28 | 1 | 3 | 5 |
| 29 | 2 | 5 | 2 |

| IMPLEMENTATION | | |
| --- | --- | --- |
| FEATURE NO. | CASE 1 | CASE 2 |
| 1 | Enabled | Enabled |
| 2 | Activated | Activated |
| 3 | Enabled | Disabled |
| 4 | Enabled | Disabled |
| 5 | Activated | Activated |
| 6 | Enabled | Disabled |
| 7 | Enabled | Disabled |
| 8 | Enabled | Disabled |
| 9 | Activated | Activated |
| 10 | Activated | Activated |
| 11 | Enabled | Disabled |
| 12 | Activated | Activated |
| 13 | Activated | Disabled |
| 14 | Enabled | Disabled |
| 15 | Activated | Disabled |
| 16 | Enabled | Enabled |
| 17 | Disabled | Enabled |
| 18 | Disabled | Disabled |
| 19 | Disabled | Disabled |
| 20 | Disabled | Activated |
| 21 | Disabled | Enabled |
| 22 | Disabled | Activated |

-continued

IMPLEMENTATION

| FEATURE NO. | CASE 1 | CASE 2 |
|---|---|---|
| 23 | Disabled | Disabled |
| 24 | Disabled | Disabled |
| 25 | Disabled | Activated |
| 26 | Disabled | Enabled |
| 27 | Disabled | Disabled |
| 28 | Disabled | Activated |
| 29 | Disabled | Activated |

Note that each of the above-referenced features has corresponding software configurable structure as represented in FIG. 13.

As is now apparent the instant invention provides a software based product—including data relating to desired outcomes, predictive metrics, and device features, obtained for one or more electronic devices—which enables the user to prioritize specific desired outcomes thereby yielding a set of customization values for output via any suitable data transfer technology to a software driven electronic device, which device uses the customization values to adjust certain parameters thereby achieving an optimized operational configuration.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A computer implemented process for customizing features of an electronic device at an end user's level based on a user's desired outcomes such that the device's features are optimally configured, said process including the steps of:

(a) defining desired outcome data for a specific electronic device, said desired outcome data including a plurality of device specific desired outcomes, each of said desired outcomes defining a benefit of value, said desired outcomes free from any solution or specification, each of said desired outcomes remaining stable over time;

(b) defining predictive metric data for said electronic device, said predictive metric data including a plurality of device specific predictive metrics, each of said predictive metrics being defined as a parameter that can be measured and controlled for satisfying at least one desired outcome, each of said predictive metrics predicting with certainty satisfaction of at least one desired outcome;

(c) defining a predictive relationship value for each desired outcome and predictive metric combination;

(d) defining customizable feature data for said electronic device, said customizable feature data including a plurality of configurable device features, each of said predictive metrics having at least one specific configurable device feature associated therewith;

(e) defining a customization relationship value for each predictive metric and device feature combination;

(f) user assigning an importance value to each desired outcome;

(g) prioritizing said desired outcomes in accordance with said assigned importance values;

(h) prioritizing said predictive metrics, wherein the prioritizing of said predictive metrics is directly related to the prioritization of said desired outcomes and said predictive relationship values;

(i) prioritizing said configurable device features, wherein the prioritizing of said configurable device features is directly related to the prioritization of said predictive metrics and said customization relationship values to establish a prioritized set of configurable features including customization values and commands for customizing the electronic device to an optimized configuration based on a user's desired outcome preferences;

(j) transferring said customization values to said electronic device via a data transfer means wherein said device receives said customization values and adjusts said configurable device features in accordance with said customization values to provide the optimized configuration for the electronic device.

2. A process for customizing features of an electronic device according to claim 1, wherein said electronic device comprises hardware having means for receiving data, data processing means, data memory means, and a plurality of configurable features, said configurable features responsive to said customization values.

3. A process for customizing features of an electronic device according to claim 1, wherein said comprises an on-line service.

4. A process for customizing features of an electronic device according to claim 1, wherein said desired outcome data is obtained by research including interviewing a statistically representative sample of individuals using neurolinquistic programming techniques to identify device specific desired outcomes and storing said desired outcomes in a data storage means.

5. A process for customizing features of an electronic device according to claim 1, wherein said predictive metric data is obtained by research including interviewing individuals involved with said device and storing said predictive metrics in a data storage means.

6. A computer-readable medium of instructions for directing a computer system to process data for customizing features of an electronic device at an end user's level based on a user's desired outcomes such that the device's features are optimally configured, said computer-readable medium of instructions including:

(a) desired outcome data means for a specific electronic device including a plurality of device specific desired outcomes, each of said desired outcomes defining a benefit of value, said desired outcomes free from any solution or specification, each of said desired outcomes remaining stable over time;

(b) predictive metric data means for said electronic device including a plurality of device specific predictive metrics, each of said predictive metrics being defined as a parameter than can be measured and controlled for satisfying at least one desired outcome, each of said predictive metrics predicting with certainty satisfaction of at least one desired outcome;

(c) predictive relationship data means including a predictive value for each desired outcome and predictive metric combination, said value indicating the degree to which a predictive metric predicts satisfaction of a desired outcome;

(d) customizable feature data means for said device, said customizable feature data including a plurality of software configurable device features, each of said predictive metrics having at least one software configurable device feature associated therewith;

(e) customization relationship data means including a customization relationship value for each predictive metric and configurable device feature combination, said customization relationship value indicating the degree to which a configurable device feature relates to a predictive metric;

(f) means for user assigning of an importance value to each desired outcome;

(g) means for prioritizing said desired outcomes based on assigned importance values;

(h) means for prioritizing said predictive metrics, wherein the prioritizing of said predictive metrics is directly related to the prioritization of said desired outcomes and said predictive relationship values;

(i) means for prioritizing data relating to said configurable device features, wherein the prioritizing of said data is directly related to the prioritization of said predictive metrics and said customization relationship values to establish a prioritized set of configurable features including customization values and commands for customizing the electronic device to an optimized configuration based on a user's desired outcome preferences;

(j) means for transferring said customization values to said electronic device via a data transfer means wherein said device receives said customization values and said device's features are configured based on said customization values to provide the optimized configuration for the electronic device.

7. A computer-readable medium of instructions according to claim 6, wherein said electronic device comprises hardware having means for receiving data, data processing means, data memory means, and a plurality of configurable features, said configurable features responsive to said customization values.

8. A computer-readable medium of instructions according to claim 6, wherein said electronic device is an on-line computer service.

9. A computer-readable medium of instructions according to claim 6, wherein said data transfer means includes means for transmitting data.

10. A computer-readable medium of instructions according to claim 9, wherein said means for transmitting data includes one of the following: a computer output port, a radio-frequency transmitter, or an infra-red transmitter.

11. A computer based system for use with a configurable electronic device, said system including a computer-readable medium of instructions for directing the computer system to process data relating to said electronic device for obtaining a set of device customization values based on a user's desired outcomes and transferring said customization values to the device, at an end user's level, such that adjustable device features are optimally configured, said computer based system including a data storage means, processor means, memory means, display means, output means, and user interface means for receiving user inputs, said system comprising:

(a) desired outcome data means for a specific electronic device in communication with said data storage means, said processor means and said memory means, said desired outcome data means including a plurality of device specific desired outcomes, each of said desired outcomes defining a benefit of value, said desired outcomes free from any solution or specification, each of said desired outcomes remaining stable over time;

(b) predictive metric data means for said device in communication with aid data storage means, said processor means and said memory means, said predictive metric data means including a plurality of device specific predictive metrics, each of said predictive metrics being defined as a parameter that can be measured and controlled for satisfying at least one desired outcome, each of said predictive metrics predicting with certainty satisfaction of at least one desired outcome;

(c) predictive relationship data means in communication with said data storage means, said processor means and said memory means, said predictive relationship data means including a predictive value for each desired outcome and predictive metric combination, said value indicating the degree to which a predictive metric predicts satisfaction of a desired outcome;

(d) customizable device feature data means in communication with said data storage means, said processor means, said memory means, said customizable device feature data including a plurality of software configurable device features, each of said predictive metrics having at least one software configurable device feature associated therewith;

(e) customization relationship data means in communication with said data storage means, said processor means, said memory means, including a customization relationship value for each predictive metric and configurable device feature combination, said customization relationship value indicating the degree to which a configurable device feature relates to a predictive metric;

(f) means for displaying said desired outcomes to a user;

(g) means for user assignment of importance values to said desired outcomes;

(h) algorithm means for prioritizing said desired outcomes based on said assigned importance values;

(i) algorithm means for prioritizing said predictive metrics, wherein the prioritizing of said predictive metrics is directly related to the prioritization of said desired outcomes and said predictive relationship values;

(j) algorithm means for prioritizing said configurable device features, wherein the prioritizing of said configurable device features is directly related to the prioritization of said predictive metrics and said customization relationship values to establish a prioritized set of configurable features including customization values and commands for customizing the electronic device to an optimized configuration based on a user's desired outcome preferences;

(k) means for transferring said customization values to said device via a data transfer means wherein said device receives said customization values and adjustable device features are configured based on said customization values to provide the optimized configuration for the electronic device.

12. A computer implemented process for individually customizing an electronic device at an end user's level that can be electronically programmed for desired operational functions including the steps of:

(a) accumulating a data base containing desired outcomes relating to a particular electronic device, predictive metrics which predict satisfaction with certainty of at least one desired outcome and customizable electronic device features, each of said predictive metrics having at least one customizable electronic device feature associated therewith;

(b) creating an operating computer program for receiving input relating to a specific user's desired outcomes and predictive metrics;

(c) assigning importance values to said desired outcomes and prioritizing said predictive metrics using matrix analysis;

(d) prioritizing said customizable electronic device features using matrix analysis;

(e) processing data from said data base to determine settings for each of said customizable electronic device features; and (f) operationally interfacing said computer program and said electronic device by transmitting data relating to settings for each of said customizable electronic device features to said electronic device, whereby said electronic device uses said data to configure or adjust each of said customizable electronic device features in accordance with said settings to provide an optimized configuration for the electronic device.

* * * * *